(12) United States Patent
Kim et al.

(10) Patent No.: US 12,452,873 B2
(45) Date of Patent: Oct. 21, 2025

(54) METHOD AND DEVICE FOR TRANSMISSION AND RECEPTION BASED ON NON-APPROVAL IN WIRELESS COMMUNICATION SYSTEM

(71) Applicant: Samsung Electronics Co., Ltd., Suwon-si (KR)

(72) Inventors: Taehyoung Kim, Suwon-si (KR); Jinkyu Kang, Suwon-si (KR); Youngbum Kim, Suwon-si (KR); Sungjin Park, Suwon-si (KR); Jinyoung Oh, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 17/796,062

(22) PCT Filed: Jan. 22, 2021

(86) PCT No.: PCT/KR2021/000909
§ 371 (c)(1),
(2) Date: Jul. 28, 2022

(87) PCT Pub. No.: WO2021/153951
PCT Pub. Date: Aug. 5, 2021

(65) Prior Publication Data
US 2023/0081792 A1    Mar. 16, 2023

(30) Foreign Application Priority Data
Jan. 31, 2020   (KR) .................. 10-2020-0012235

(51) Int. Cl.
*H04W 72/23* (2023.01)
*H04L 1/1829* (2023.01)
(Continued)

(52) U.S. Cl.
CPC ........... *H04W 72/23* (2023.01); *H04L 1/1864* (2013.01); *H04W 68/005* (2013.01); *H04W 72/11* (2023.01); *H04W 72/1273* (2013.01)

(58) Field of Classification Search
None
See application file for complete search history.

(56) References Cited

U.S. PATENT DOCUMENTS

2019/0082454 A1   3/2019  Shi et al.
2021/0099980 A1*  4/2021  Khoshnevisan ...... H04W 72/23
(Continued)

FOREIGN PATENT DOCUMENTS

KR  10-2020-0018138 A   2/2020
WO     2019/028276 A1   2/2019

OTHER PUBLICATIONS

Catt, Power saving signal/channel design and performance, R1-1912179, 3GPP TSG RAN WG1 Meeting #99, Nov. 9, 2019, Reno, USA.
(Continued)

*Primary Examiner* — Jutai Kao
(74) *Attorney, Agent, or Firm* — Jefferson IP Law, LLP

(57) ABSTRACT

The present disclosure relates to a method and apparatus for performing grant-free transmission and reception in a wireless communication system, and a grant-free reception method performed by a terminal in a mobile communication system according to an embodiment of the disclosure includes receiving, from a base station, configuration information related to downlink semi-persistent scheduling (SPS) and configuration information related to a data indication signal (DIS), receiving, from the base station, downlink SPS activation indication information, monitoring the DIS based on the configuration information related to the DIS, and when the DIS is detected or when the DIS is detected and monitoring indication information for a downlink data channel is obtained from the DIS, monitoring the downlink data
(Continued)

channel based on at least one of the configuration related to downlink SPS and the downlink SPS activation indication information.

15 Claims, 16 Drawing Sheets

(51) Int. Cl.
  *H04W 68/00* (2009.01)
  *H04W 72/11* (2023.01)
  *H04W 72/1273* (2023.01)

(56) References Cited

U.S. PATENT DOCUMENTS

2021/0153236 A1* 5/2021 Yi ..................... H04W 72/1273
2021/0321433 A1  10/2021 Kim et al.
2022/0247542 A1* 8/2022 Xu ....................... H04L 5/0096

OTHER PUBLICATIONS

Xiaomi Communications, Procedures on how the PDCCH-WUS works with C-DRX, R2-1914988, 3GPP TSG-RAN2# 108, Nov. 8, 2019, Reno, Nevada, US.

Huawei et al., Further discussion on the impact of PDCCH-WUS, R2-1915263, 3GPP TSG-RAN2 Meeting#108, Nov. 8, 2019, Reno, Nevada, USA.

International Search Report dated Apr. 22, 2021, issued in International Application No. PCT/KR2021/000909.

Samsung, On UE adaptation schemes, R1-1901087, 3GPP TSG RAN WG1 Ad-Hoc Meeting 1901, Jan. 11, 2019.

ZTE, Discussion on PDCCH-based power saving signal, R1-1908198, 3GPP TSG RAN WG1 #98, Aug. 17, 2019.

Korean Office Action dated Apr. 1, 2025, issued in Korean Patent Application No. 10-2020-0012235.

* cited by examiner

METHOD AND DEVICE FOR TRANSMISSION AND RECEPTION BASED ON NON-APPROVAL IN WIRELESS COMMUNICATION SYSTEM

TECHNICAL FIELD

The present disclosure relates to a method and apparatus for performing communication in a wireless communication system, and more particularly, to a method and apparatus for performing grant-free transmission and reception.

BACKGROUND ART

Efforts have been made to develop an improved 5th generation (5G) communication system or pre-5G communication system to keep up with growing wireless data traffic demand after the commercialization of 4th generation (4G) communication systems. For this reason, the 5G or pre-5G communication system is called a beyond 4G network communication system or a post long-term evolution (LTE) system. Implementation of 5G communication systems in an ultra-high frequency (millimeter-wave (mmWave)) band (such as a 60 (80)-GHz band) is under consideration to achieve high data transfer rates. To mitigate path loss of radio waves and increase transmission distance of radio waves in an ultra-high frequency band for 5G communication systems, technologies such as beamforming, massive multiple-input multiple-output (massive MIMO), full dimensional MIMO (FD-MIMO), array antennas, analog beamforming, and large-scale antennas are being studied. Furthermore, to improve system networks for 5G communication systems, various technologies including evolved small cells, advanced small cells, cloud radio access network (Cloud-RAN), ultra-dense networks, device to device (D2D) communication, wireless backhaul, moving networks, cooperative communication, coordinated multi-points (CoMP), and received-interference cancellation are currently being developed. In addition, for 5G systems, advanced coding modulation (ACM) schemes such as hybrid FSK and QAM modulation (FQAM) and sliding window superposition coding (SWSC) and advanced access techniques such as filter bank multicarrier (FBMC), non-orthogonal multiple access (NOMA), sparse code multiple access (SCMA), etc. are being developed.

Moreover, the Internet has evolved from a human-centered connection network, in which humans create and consume information, to the Internet of things (IoT) network in which dispersed components such as objects exchange information with one another to process the information. Internet of Everything (IoE) technology has emerged, in which the IoT technology is combined with, for example, technology for processing big data through connection with a cloud server. To implement the IoT, technologies such as a sensing technology, a wired/wireless communication and network infrastructure, a service interface technology, and a security technology are required, and thus, research has recently been conducted into technologies such as sensor networks for interconnecting objects, machine to machine (M2M) communication, and machine type communication (MTC). In an IoT environment, intelligent Internet technology services may be provided to create new values for human life by collecting and analyzing data obtained from interconnected objects. The IoT may be applied to various fields such as smart homes, smart buildings, smart cities, smart cars or connected cars, a smart grid, health care, smart home appliances, advanced medical services, etc., through convergence and integration between existing information technology (IT) and various industries.

Thus, various attempts are being made to apply a 5G communication system to the IoT network. For example, technologies such as sensor networks, M2M communication, MTC, etc., are implemented using 5G communication techniques such as beamforming, MIMO, array antennas, etc. The application of a cloud RAN as the above-described big data processing technology may be an example of convergence between the 3eG and IoT technologies.

As various services may be provided with advancements in wireless communication systems and the aforementioned techniques, a method for seamlessly providing these services is required.

DESCRIPTION OF EMBODIMENTS

Solution to Problem

According to an embodiment of the disclosure, a grant-free reception method performed by a terminal in a mobile communication system may include receiving, from a base station, configuration information related to downlink semi-persistent scheduling (SPS) and configuration information related to a data indication signal (DIS), receiving, from the base station, downlink SPS activation indication information, monitoring the DIS based on the configuration information related to the DIS, and when the DIS is detected or when the DIS is detected and monitoring indication information for a downlink data channel is obtained from the DIS, monitoring the downlink data channel based on at least one of the configuration related to downlink SPS and the downlink SPS activation indication information.

According to an embodiment of the disclosure, a grant-free transmission method performed by a base station in a mobile communication system may include transmitting, to a terminal, configuration information related to downlink SPS and configuration information related to a DIS, transmitting, to the terminal, downlink SPS activation indication information, when there is a downlink data channel to be transmitted based on the configuration information related to the downlink SPS, transmitting the DIS to the terminal based on the configuration information related to the DIS, and transmitting the downlink data channel.

According to an embodiment of the disclosure, a terminal performing grant-free reception in a mobile communication system may include a communicator, at least one memory storing a program for performing the grant-free reception method, and at least one processor configured to execute the program for performing the grant-free reception method to control receiving, from a base station, configuration information related to downlink SPS and configuration information related to a DIS, receiving, from the base station, downlink SPS activation indication information, monitoring the DIS based on the configuration information related to the DIS, and when the DIS is detected or when the DIS is detected and monitoring indication information for a downlink data channel is obtained from the DIS, monitoring the downlink data channel based on at least one of the configuration related to downlink SPS and the downlink SPS activation indication information.

According to an embodiment of the disclosure, a base station performing a grant-free transmission method in a mobile communication system may include a communicator, at least one memory storing a program for performing the grant-free transmission method, and at least one processor configured to execute the program for performing the grant-free transmission method to control transmitting, to a terminal, configuration information related to downlink SPS and configuration information related to a DIS, transmitting, to the terminal, downlink SPS activation indication information, when there is a downlink data channel to be transmitted based on the configuration information related to the downlink SPS, transmitting the DIS to the terminal based on the configuration information related to the DIS, and transmitting the downlink data channel.

Advantageous Effects of Disclosure

According to embodiments of the disclosure, services may be effectively provided in a wireless communication system by using grant-free data transmission and reception methods.

BEST MODE

Figure 1:
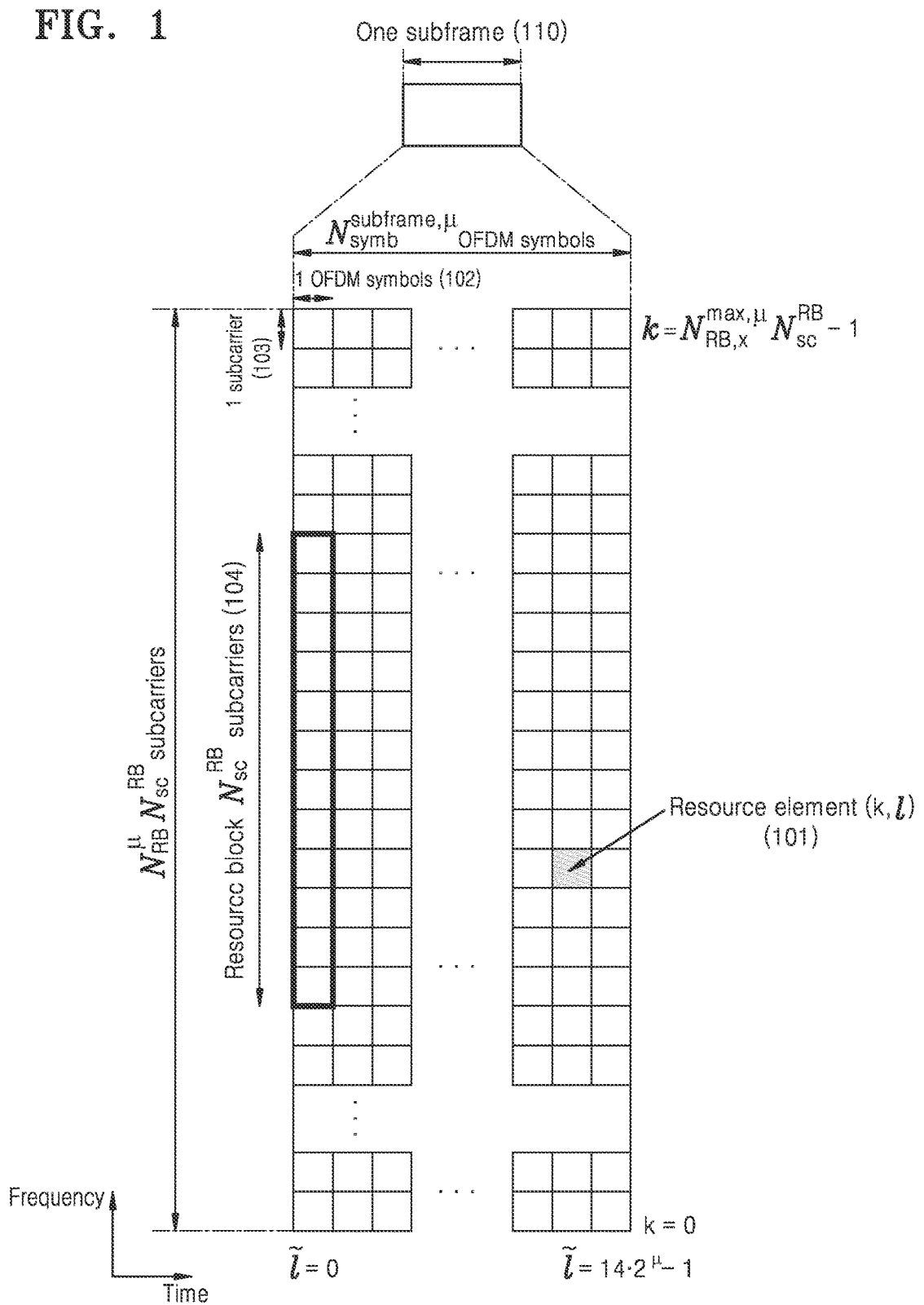
FIG. 1 illustrates a basic structure of a time-frequency domain that is a radio resource region for transmitting data or control channels in a 5th generation (5G) wireless communication system.

According to an embodiment of the disclosure, a grant-free reception method performed by a terminal in a mobile communication system may include receiving, from a base station, configuration information related to downlink semi-persistent scheduling (SPS) and configuration information related to a data indication signal (DIS), receiving downlink SPS activation indication information from the base station, monitoring the DIS based on the configuration information related to the DIS, and when the DIS is detected or when the DIS is detected and monitoring indication information for a downlink data channel is obtained from the DIS, monitoring the downlink data channel based on at least one of the configuration related to downlink SPS and the downlink SPS activation indication information.

In an embodiment, the grant-free reception method may further include, when the downlink SPS activation indication information is received from the base station, stopping monitoring a downlink control channel for receiving the downlink data channel.

In an embodiment, the grant-free reception method may further include starting monitoring the downlink control channel for receiving the downlink data channel when receiving downlink SPS release indication information from the base station, when failing to decode the downlink data channel, when transmitting a negative acknowledgement (NACK) feedback to the base station as hybrid automatic repeat request ACK (HARQ-ACK) information, when receiving information indicating a start of monitoring of the downlink control channel, or when a timer expires.

In an embodiment, the configuration information related to the DIS may include at least one of a transmission resource for the DIS, an offset between the DIS and a resource region configured by DL SPS configuration information, association between the DIS and a transmission resource for the downlink data channel, and information related to a method of transmitting the DIS.

In an embodiment, the DIS may include at least one of the monitoring indication information for the downlink data channel, information about a time period during which monitoring of the downlink data channel is to be performed, and information related to retransmission.

According to an embodiment of the disclosure, a grant-free transmission method performed by a base station in a mobile communication system may include transmitting, to the terminal, configuration information related to downlink SPS and configuration information related to a DIS, transmitting downlink SPS activation indication information to the terminal, when there is a downlink data channel to be transmitted based on the configuration information related to the downlink SPS, transmitting the DIS to the terminal based on the configuration information related to the DIS, and transmitting the downlink data channel.

In an embodiment, the grant-free transmission method may further include, when the downlink SPS activation indication information is transmitted to the terminal, stopping transmitting a downlink control channel for transmitting the downlink data channel.

In an embodiment, the grant-free transmission method may further include transmitting the downlink control channel for transmitting the downlink data channel when transmitting downlink SPS release indication information to the UE, when receiving a NACK feedback from the terminal as HARQ-ACK information, or when transmitting information indicating a start of monitoring of the downlink control channel to the terminal.

In an embodiment, the configuration information related to the DIS may include at least one of a transmission resource for the DIS, an offset between the DIS and a resource region configured by DL SPS configuration information, association between the DIS and a transmission resource for the downlink data channel, and information related to a method of transmitting the DIS.

In an embodiment, the DIS may include at least one of the monitoring indication information for the downlink data channel, information about a time period during which monitoring of the downlink data channel is to be performed, and information related to retransmission.

According to another embodiment of the disclosure, a terminal performing grant-free reception in a mobile communication system may include: a communicator; at least one memory storing a program for performing the grant-free reception method; and at least one processor configured to execute the program for performing the grant-free reception method to control: receiving, from a base station, configuration information related to downlink SPS and configuration information related to a DIS; receiving downlink SPS activation indication information from the base station; monitoring the DIS based on the configuration information related to the DIS; and when the DIS is detected or when the DIS is detected and monitoring indication information for a downlink data channel is obtained from the DIS, monitoring the downlink data channel based on at least one of the configuration related to downlink SPS and the downlink SPS activation indication information.

In an embodiment, the at least one processor may be further configured to control, when the downlink SPS activation indication information is received from the base station, stopping monitoring a downlink control channel for receiving the downlink data channel.

In an embodiment, the at least one processor may be further configured to control starting monitoring the downlink control channel for receiving the downlink data channel when receiving downlink SPS release indication information from the base station, when failing to decode the downlink data channel, when transmitting a NACK feedback to the base station as HARQ-ACK information, when receiving information indicating a start of monitoring of the downlink control channel, or when a timer expires.

In an embodiment, the configuration information related to the DIS may include at least one of a transmission resource for the DIS, an offset between the DIS and a resource region configured by DL SPS configuration information, association between the DIS and a transmission resource for the downlink data channel, and information related to a method of transmitting the DIS.

In an embodiment, the DIS may include at least one of the monitoring indication information for the downlink data channel, information about a time period during which monitoring of the downlink data channel is to be performed, and information related to retransmission.

According to another embodiment of the disclosure, a base station performing a grant-free transmission method in a mobile communication system may include: a communicator; at least one memory storing a program for performing the grant-free transmission method; and at least one processor configured to execute the program for performing the grant-free transmission method to control: transmitting, to the terminal, configuration information related to downlink SPS and configuration information related to a DIS; transmitting downlink SPS activation indication information to the terminal; when there is a downlink data channel to be transmitted based on the configuration information related to the downlink SPS, transmitting the DIS to the terminal based on the configuration information related to the DIS; and transmitting the downlink data channel.

In an embodiment, the at least one processor may be further configured to control, when the downlink SPS activation indication information is transmitted to the terminal, stopping transmitting a downlink control channel for transmitting the downlink data channel.

In an embodiment, the at least one processor may be further configured to control transmitting the downlink control channel for transmitting the downlink data channel when transmitting downlink SPS release indication information to the UE, when receiving a NACK feedback from the terminal as HARQ-ACK information, or when transmitting information indicating a start of monitoring of the downlink control channel to the terminal.

In an embodiment, the configuration information related to the DIS may include at least one of a transmission resource for the DIS, an offset between the DIS and a resource region configured by DL SPS configuration information, association between the DIS and a transmission resource for the downlink data channel, and information related to a method of transmitting the DIS.

In an embodiment, the DIS may include at least one of the monitoring indication information for the downlink data channel, information about a time period during which monitoring of the downlink data channel is to be performed, and information related to retransmission.

Mode of Disclosure

Hereinafter, embodiments of the present disclosure will be described in detail with reference to the accompanying drawings.

In the following description of embodiments, descriptions of technical features that are well-known in the art to which the present disclosure pertains and are not directly related to the present disclosure are omitted. This is for clearly describing the essence of the present disclosure without obscuring it by omitting the unnecessary descriptions.

For the same reason, in the accompanying drawings, some components are exaggerated, omitted, or schematically illustrated. Furthermore, the size of each element does not entirely reflect an actual size thereof. In the drawings, like reference numerals refer to the same or corresponding elements throughout.

Advantages and features of the present disclosure and methods of accomplishing the same will be more readily appreciated by referring to the following description of embodiments and the accompanying drawings. However, the present disclosure may be embodied in many different forms and should not be construed as being limited to the disclosed embodiments set forth below; rather, the present embodiments are provided so that the present disclosure will be thorough and complete and will fully convey the scope of the disclosure to those of ordinary skill in the art, and the disclosure will only be defined by the appended claims. Throughout the specification, like reference numerals refer to like elements. Furthermore, in the following description of the disclosure, related functions or configurations are not described in detail because they would obscure the essence of the present disclosure with unnecessary detail. Furthermore, the terms to be described later are defined by taking functions described in the present disclosure into account and may be changed according to a user's or operator's intent or customs. Therefore, definition of the terms should be made based on the overall descriptions in the present specification.

Hereinafter, a base station (BS) is an entity responsible for allocating resources to a terminal, and may be at least one of a next-generation Node B (gNB), an evolved Node B (eNB), a Node B, a BS, a wireless access unit, a BS controller, or a network node. A terminal may include a user equipment (UE), a mobile station (MS), a cellular phone, a smart phone, a computer, or a multimedia system capable of performing a communication function. In the present disclosure, a downlink (DL) refers to a radio transmission path via which a BS transmits a signal to a terminal, and an uplink (UL) refers to a radio transmission path via which the terminal transmits a signal to the BS. Furthermore, although embodiments of the present disclosure are hereinafter described with respect to a long-term evolution (LTE) or LTE-Advanced (LTE-A) system, the embodiments of the present disclosure may be applied to other communication systems having similar technical backgrounds and channel configurations. For example, a 5G new radio (NR) mobile communication technology developed after LTE-A may be included in the other communication systems, and hereinafter, 5G is a concept including existing LTE, LTE-A and other similar services. It should be also understood by those skilled in the art that the present disclosure is applicable to other communication systems through modifications not departing from the scope of the present disclosure.

It will be understood that each block of a flowchart in the drawings and combinations of blocks of the flowchart may be performed by computer program instructions. These computer program instructions may be loaded into a processor of a general-purpose computer, special-purpose computer, or another programmable data processing equipment, and thus, the instructions performed via the processor of the computer or the other programmable data processing equipment create a means for performing functions specified in the flowchart block(s). The computer program instructions may also be stored in a computer-executable or computer-readable memory capable of directing a computer or another programmable data processing equipment to implement functions in a specific manner, and thus, the instructions stored in the computer-executable or computer-readable memory may produce an article of manufacture including the instruction means for performing the functions described in the flowchart block(s). The computer program instructions may also be loaded into a computer or another programmable data processing equipment, and thus, instructions for operating the computer or the other programmable data processing apparatus by generating a computer-executed process when a series of operations are performed in the computer or the other programmable data processing equipment may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two blocks illustrated in succession may be executed substantially simultaneously, or the blocks may sometimes be executed in reverse order depending on functions corresponding thereto.

As used herein, the term "unit" denotes a software element or a hardware element such as a field-programmable gate array (FPGA) or an application-specific integrated circuit (ASIC), and the unit" performs certain functions. However, the term "unit" is not limited to software or hardware. The "unit" may be configured so as to be in an addressable storage medium, or may be configured so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. In addition, in an embodiment, the "unit" may include one or more processors.

Wireless communication systems have progressed beyond providing initial voice-centered services into broadband wireless communication systems that provide high-speed, high-quality packet data services based on communication standards such as 3rd Generation Partnership Project (3GPP)'s High Speed Packet Access (HSPA), LTE or Evolved Universal Terrestrial Radio Access (E-UTRA), LTE-A, LTE-Pro, 3GPP2's High Rate Packet Data (HRPD), Ultra Mobile Broadband (UMB), and the Institute of Electrical and Electronic Engineers (IEEE) 802.16e.

As a representative example of a broadband wireless communication system, an LTE system adopts an orthogonal frequency division multiplexing (OFDM) scheme for DL and a single carrier frequency division multiple access (SC-FDMA) scheme for UL. UL refers to a radio link through which a UE or MS transmits data or a control signal to a BS (or eNB), and DL refers to a radio link through which the BS transmits data or a control signal to the UE. In the multiple access schemes as described above, data or control information of each user may be identified by allocating and operating time-frequency resources carrying the data or the control information for each user to prevent overlapping i.e., obtain orthogonality between the time-frequency resources.

Because a post-LTE communication system, i.e., a 5G communication system, needs to be able to freely reflect various requirements from users and service providers, the 5G communication system is required to support services that simultaneously satisfy the various requirements. Services being considered for 5G communication systems include Enhanced Mobile BroadBand (eMBB), Massive Machine Type Communication (mMTC), Ultra-Reliable Low-Latency Communication (URLLC), etc.

eMBB may aim to provide higher data transfer rates than those supported by the existing LTE, LTE-A, or LTE-Pro. For example, in 5G communication systems, eMBB should be able to deliver peak data rates of 20 gigabits per second (Gbps) in DL and 10 Gbps in UL from a BS perspective. Furthermore, the 5G communication systems should be able to provide better user perceived data rates while simultaneously delivering the peak data rates. To meet such requirements, the 5G communication systems may require improvement of various transmission and reception technologies including a further improved multi-input multi-output (MIMO) transmission technology. Furthermore, while a current LTE system transmits signals by using a maximum transmission bandwidth of 20 megahertz (MHz) in the 2 GHz band, a 5G communication system may satisfy data transfer rates required by a 5G technology by using a wider frequency bandwidth than 20 MHz in the 3 GHz to 6 GHz bands or the bands above 6 GHz.

At the same time, mMTC is being considered to support application services such as the IoT in 5G communication systems. In order to efficiently provide the IoT, the mMTC may require support of massive connections with terminals in a cell, enhanced terminal coverage, improved battery life, low terminal cost, etc. Because the IoT is a system equipped with multiple sensors and various devices to provide communication functions, it must be able to support a large number of terminals (e.g., 1,000,000 terminals per square kilometer (km²)) in a cell. Furthermore, because a terminal supporting the mMTC is highly likely to be located in a shaded area that cannot be covered by a cell, such as a basement of a building, due to characteristics of the service, the mMTC may require wide area coverage compared to other services provided by a 5G communication system. The terminal supporting the mMTC should be configured as a low-cost terminal and require a very long battery lifetime such as 10 to 15 years because it is difficult to frequently replace a battery of the terminal.

Lastly, URLLC is a cellular-based wireless communication service used for mission-critical applications. For example, possible applications of the URLLC may include remote control of robots or machinery, industrial automation, unmanned aerial vehicles (UAVs), remote health care, emergency alert services, etc. Thus, URLLC communications should be able to provide very low latency and very high reliability. For example, services supporting URLLC need to satisfy air interface latency of less than 0.5 milliseconds (ms) and simultaneously have requirements of packet error rate of equal to or less than $10^{-5}$. Thus, for the services supporting URLLC, a 5G system has to provide a transmission time interval (TTI) shorter than for other services and may simultaneously require a design for allocating wide frequency-band resources to ensure high reliability of a communication link.

The three services supported by 5G, i.e., eMBB, URLLC, and mMTC, may be multiplexed in one system for transmission. In this regard, different transmission and reception techniques and transmission and reception parameters may be used between services to satisfy different requirements for the respective services.

Hereinafter, a frame structure in a 5G system is described in more detail with reference to FIG. 1.

FIG. 1 illustrates a basic structure of a time-frequency domain that is a radio resource region for transmitting data or control channels in a 5G wireless communication system.

Referring to FIG. 1, the abscissa represents a time domain and the ordinate represents a frequency domain. A resource element (RE) 101 is a basic unit of a resource grid in the time and frequency domains, and may be defined as 1 OFDM symbol 102 in the time domain and 1 subcarrier 103 in the frequency domain. $N_{SC}^{RB}$ (e.g., 12) consecutive REs in the frequency domain may constitute a resource block (RB) 104.

Figure 2:
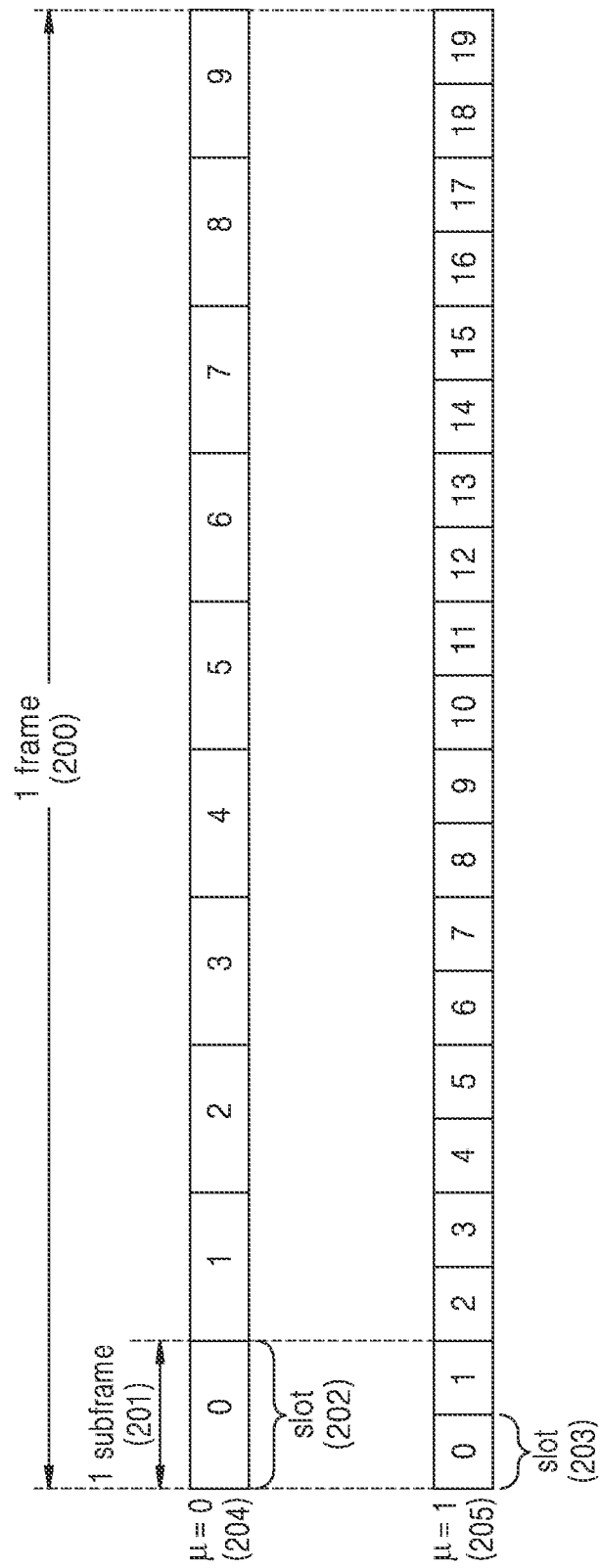
FIG. 2 illustrates an example of a slot structure used in a 5G wireless communication system.

FIG. 2 illustrates an example of a slot structure used in a 5G wireless communication system.

Referring to FIG. 2, an example of a structure of a frame 200, a subframe 201, and a slot 202 is illustrated. One frame 200 may be defined as 10 ms in length. One subframe 201 may be defined as 1 ms in length, and the frame 200 may be composed of a total of 10 subframes 201. Each slot 202 or 203 may be defined as having 14 OFDM symbols (i.e., the number $N_{symb}^{slot}$ of symbols per slot=14). Each subframe 201 may consist of one or multiple slots 202 and 203, and the number of slots 202 and 203 in the subframe 201 may vary according to a subcarrier spacing configuration value μ (204 and 205). The example of FIG. 2 illustrates cases where a subcarrier spacing configuration value μ=0 (204) and μ=1 (205). When μ=0 (204), the subframe 201 may be composed of one slot 202, and when μ=1 (205), the subframe 201 may be composed of two slots 203. In other words, the number $N_{slot}^{subframe,\mu}$ of slots per subframe slot may vary according to a subcarrier spacing configuration value μ, and accordingly, the number $N_{slot}^{frame,\mu}$ of slots per frame may vary.

$N_{slot}^{subframe,\mu}$ and $N_{slot}^{frame,\mu}$ according each subcarrier spacing configuration value μ may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, configuration for a bandwidth part (BWP) in a 5G communication system is described in detail with reference to FIG. 3.

Figure 3:
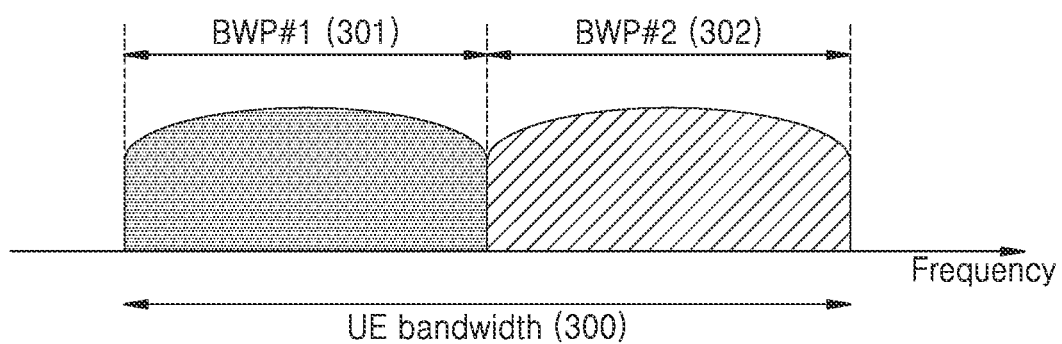
FIG. 3 illustrates an example of configuration of a bandwidth part (BWP) in a 5G wireless communication system.

FIG. 3 illustrates an example of configuration for a bandwidth part (BWP) in a 5G wireless communication system.

FIG. 3 shows an example in which a UE bandwidth 300 is configured to include two BWPS, i.e., BWP #1 301 and BWP #2 302. A BS may configure one or a plurality of BWPs for a UE, and configure the following pieces of information for each BWP.

TABLE 2

| BWP ::= | SEQUENCE { |
|---|---|
| bwp-Id | BWP-Id, |
| locationAndBandwidth | INTEGER (1..65536), |
| subcarrierSpacing | ENUMERATED {n0, n1, n2, n3, n4, n5}, |
| cyclicPrefix | ENUMERATED { extended } |
| } | |

However, configuration for a BWP is not limited to the example, and various parameters related to a BWP may be configured for the UE in addition to the above configuration information. The BS may transmit these pieces of configuration information to the UE via higher layer signaling, e.g., radio resource control (RRC) signaling. At least one BWP among the configured one or plurality of BWPs may be activated. An indication indicating whether the configured BWP is activated may be transmitted from the BS to the UE semi-statically via RRC signaling or dynamically via DL control information (DCI).

According to an embodiment, before being RRC connected, the UE may be configured by the BS with an initial BWP for initial access via a master information block (MIB). More specifically, during an initial access phase, the UE may receive, via the MIB, configuration information for a control region, i.e., a control resource set (CORESET) and a search space where a physical DL control channel (PDCCH) for receiving system information (that may correspond to remaining system information (RMSI) or system information block 1 (SIB1)) required for initial access may be transmitted. The control region and the search space configured via the MIB may be each considered to have identity (ID) 0. The BS may notify, via the MIB, the UE of configuration information such as frequency allocation information, time allocation information, numerology, etc., for control region #0. The BS may also notify, via the MIB, the UE of configuration information, such as a monitoring periodicity and a monitoring occasion for the control region #0, i.e., configuration information for search space #0. The UE may consider a frequency region configured as the control region #0 and obtained from the MIB as an initial BWP for initial access. In this case, an ID of the initial BWP may be considered as 0.

Configuration of a BWP supported by the 5G wireless communication system may be used for various purposes.

According to an embodiment, when a bandwidth supported by the UE is smaller than a system bandwidth, the configuration of a BWP may support the small bandwidth. For example, the BS may configure the UE with frequency location of a BWP (configuration information 2), so that the UE is allowed to transmit or receive data at the particular frequency location in the system bandwidth.

Furthermore, according to an embodiment, for the purpose of supporting different numerologies, the BS may configure a plurality of BWPs for the UE. For example, to support all data transmission and reception using 15 KHz and 30 KHz subcarrier spacings for a UE, two BWPs may be configured to use 15 KHz and 30 KHz subcarrier spacings, respectively. Different BWPs may be frequency division multiplexed, and when data is transmitted or received using a particular subcarrier spacing, a BWP configured with the subcarrier spacing may be activated.

Furthermore, according to an embodiment, the BS may configure BWPs with different bandwidth sizes for the UE for the purpose of reducing power consumption of the UE. For example, when the UE supports a very large bandwidth, e.g., 100 MHz bandwidth, and always transmits or receives data in the bandwidth, very high power consumption may occur. In particular, in a situation where there is no traffic, monitoring unnecessary DL control channel in the large 100 MHz bandwidth may be very inefficient in terms of power consumption. For the purpose of reducing the power consumption of the UE, the BS may configure a BWP with a relatively small bandwidth, e.g., a 20 MHz BWP, for the UE. In the situation where there is no traffic, the UE may perform a monitoring operation in the 20 MHz BWP, and when data occurs, the UE may transmit or receive the data in the 100 MHz BWP according to instruction by the BS.

In a method of configuring a BWP, before being RRC connected, UEs may receive configuration information for an initial BWP via the MIB in an initial access phrase. In detail, the UE may receive, via the MIB on a physical broadcast channel (PBCH), configuration of a control region, i.e., a CORESET, for a DL control channel on which DCI for scheduling an SIB may be transmitted. A BWP for a control region configured via the MIB may be considered as an initial BWP, and the UE may receive a physical DL shared channel (PDSCH) on which the MIB is transmitted in the configured initial BWP. In addition to being used for receiving an SIB, the initial BWP may be used for other system information (OSI), paging, or random access.

In a case that one or more BWPs are configured for the UE, the BS may indicate BWP switch to the UE by using a BWP indicator field in DCI. For example, when a currently activated BWP for the UE is the BWP #1 301 in FIG. 3, the BS may indicate the BWP #2 302 to the UE via a BWP indicator in the DCI, and UE may perform BWP switch to the BWP #2 302 indicated via the BWP indicator in the received DCI.

As described above, because DCI-based BWP switch may be indicated via DCI which schedules a PDSCH or a physical UL shared channel (PUSCH), upon receiving a BWP switch request, the UE shall be able to seamlessly receive or transmit the PDSCH or PUSCH scheduled by the DCI in a changed BWP. For this purpose, the standard specifies requirements for BWP switch delay $T_{BWP}$ required to perform BWP switch, and for example, the requirements may be defined as follows.

TABLE 3

| μ | NR Slot length (ms) | BWP switch delay $T_{BWP}$ (slots) | |
|---|---|---|---|
| | | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 17 |

*Note* [1]Depends on UE capability.
*Note* [2]If the BWP switch involves changing of SCS, the BWP switch delay is determined by the larger one between the SCS before BWP switch and the SCS after BWP switch.

The requirements for the BWP switch delay support Type 1 or Type 2 depending on UE capability. The UE may report a supportable BWP switch delay type to the BS.

According to the above requirements for BWP switch delay, when the UE receives a DCI including a BWP switch indicator in slot n, the UE can complete switching to a new BWP indicated by the BWP switch indicator at a time that is no later than slot $n+T_{BWP}$, and perform transmission and reception of a data channel scheduled by the corresponding DCI in the new BWP. When the BS desires to schedule a data channel using a new BWP, the BS may determine time domain resource assignment for the data channel by taking into account BWP switch delay $T_{BWP}$ supported by the UE. In other words, when the BS schedules a data channel on a new BWP, in a method of determining time domain resource assignment for the data channel, the BS may schedule the corresponding data channel after the BWP switch delay. Accordingly, the UE may not expect that a DCI indicating BWP switch indicates a value of slot offset K0 or K2 smaller than the BWP switch delay time $T_{BWP}$.

If the UE receives DCI (e.g., DCI format 1_1 or 0_1) indicating BWP switch, the UE may not perform any transmission or reception during a time period from a third symbol of a slot in which a PDCCH including the DCI is received to the beginning of a slot indicated by a value of a slot offset K0 or K2 indicated by a time domain resource assignment indicator field in the DCI. For example, if the UE receives DCI indicating BWP switch in slot n, and a slot offset value indicated in the DCI is K, the UE may not perform any transmission or reception from a third symbol of slot n to a symbol before slot n+K (i.e., a last symbol of slot n+K−1).

Next, a method of configuring transmission and reception related parameters for each BWP in a 5G wireless communication system is described.

The UE may be configured by the BS with one or a plurality of BWPs and additionally with parameters to be used for transmission and reception (e.g., configuration information related to UL and DL data channels and control channels, etc.) for each of the configured BWPs. For example, referring to FIG. 3, when the UE is configured with the BWP #1 301 and the BWP #2 302, the UE may be configured with transmission/reception parameter #1 for the BWP #1 301 and transmission/reception parameter #2 for the BWP #2 302. When the BWP #1 301 is activated, the UE may perform transmission and reception with the BS based on the transmission/reception parameter #1, and when the BWP #2 302 is activated, perform transmission and reception with the BS based on the transmission/reception parameter #2.

In detail, the UE may be configured by the BS with the following parameters.

First, the following pieces of information may be configured for a UL BWP.

TABLE 4

```
BWP-Uplink ::= SEQUENCE {
  bwp-Id   BWP-Id,
  (Identifier for BWP)
  bwp-Common   BWP-UplinkCommon OPTIONAL, -- Cond SetupOtherBWP
  (Cell-specific or common parameters)
  bwp-Dedicated   BWP-UplinkDedicated OPTIONAL, -- Cond SetupOtherBWP
  (UE-specific parameters)
  ...
}
BWP-UplinkCommon ::= SEQUENCE {
  genericParameters   BWP,
  (Generic parameters)
  rach-ConfigCommon   SetupRelease { RACH-ConfigCommon } OPTIONAL,
  -- Need M
  (Common parameters related to random access)
  pusch-ConfigCommon                SetupRelease { PUSCH-ConfigCommon }
  OPTIONAL, -- Need M
  (Common parameters related to PUSCH)
  pucch-ConfigCommon                SetupRelease { PUCCH-ConfigCommon }
  OPTIONAL, -- Need M
  (Common parameters related to PUSCH)
  ...
}
BWP-UplinkDedicated ::= SEQUENCE {
  pucch-Config              SetupRelease { PUCCH-Config } OPTIONAL, -- Need M
  (UE-specific parameters related to PUCCH)
  pusch-Config              SetupRelease { PUSCH-Config } OPTIONAL, -- Need M
  (UE-specific parameters related to PUSCH)
  configuredGrantConfig
  (Parameters related to configured grant)  SetupRelease { ConfiguredGrantConfig
     } OPTIONAL, -- Need M
  srs-Config
  (Parameters related to SRS)
                                          SetupRelease { SRS-Config }
  OPTIONAL, -- Need M
  beamFailureRecoveryConfig
  (Parameters related to beam failure recovery) SetupRelease {
     BeamFailureRecoveryConfig } OPTIONAL, -- Cond SpCellOnly
  ...
}
```

As shown in Table 4 above, the UE may be configured by the BS with cell-specific (or cell common or common) transmission-related parameters (e.g., parameters related to a random access channel (RACH), a physical UL control channel (PUCCH), and a PUSCH) (corresponding to BWP-UplinkCommon). In addition, the UE may be configured by the BS with UE-specific (or dedicated) transmission-related parameters (e.g., parameters related to a PUCCH, a PUSCH, grant-free UL transmission (configured grant PUSCH), and a sounding reference signal (SRS)) (corresponding to BWP-UplinkDedicated).

Next, the following pieces of information may be configured for a DL BWP.

TABLE 5

```
BWP-Downlink ::= SEQUENCE {
  bwp-Id   BWP-Id,
  (BWP identifier)
  bwp-Common   BWP-DownlinkCommon OPTIONAL, -- Cond
     SetupOtherBWP
  (Cell-specific or common parameters)
  bwp-Dedicated   BWP-DownlinkDedicated OPTIONAL, -- Cond
     SetupOtherBWP
  (UE-specific parameters)
  ...
}
BWP-DownCommon ::= SEQUENCE {
  genericParameters   BWP,
  (Generic parameters)
  pdcch-ConfigCommon           SetupRelease { PDCCH-ConfigCommon }
  OPTIONAL, -- Need M
  (Common parameters related to PDCCH)
  pdsch-ConfigCommon           SetupRelease { PDSCH-ConfigCommon }
  OPTIONAL, -- Need M
  (Common parameters related to PDSCH)
  ...
}
```

TABLE 5-continued

```
BWP-DownDedicated ::= SEQUENCE {
  pdcch-Config               SetupRelease { PDCCH-Config } OPTIONAL, -- Need M
  (UE-specific parameters related to PDCCH)
  pdsch-Config               SetupRelease { PDSCH-Config } OPTIONAL, -- Need M
  (UE-specific parameters related to PDSCH)
  sps-Config
  (Parameters related to SPS) SetupRelease { SPS-Config } OPTIONAL, -- Need
     M
  radioLinkMonitoringConfig
  (Parameters related to RLM)    SetupRelease { radioLinkMonitoringConfig}
     OPTIONAL, -- Cond SpCellOnly
  ...
}
```

As shown in Table 5 above, the UE may be configured by the BS with cell-specific (or cell common or common) reception-related parameters (e.g., parameters related to a PDCCH and a PDSCH) (corresponding to BWP-Downlink-Common). In addition, the UE may be configured by the BS with UE-specific (or dedicated) reception-related parameters (e.g., parameters related to a PDCCH, a PDSCH, grant-free DL transmission (semi-persistent scheduled PDSCH), and radio link monitoring (RLM)) (corresponding to BWP-UplinkDedicated).

Next, DCI in a 5G wireless communication system is described in detail.

In the 5G wireless communication system, scheduling information for UL data (or physical UL data channel (PUSCH)) or DL data (or A physical DL data channel (PDSCH)) is transmitted from the BS to the UE via the DCI. The UE may monitor a fallback DCI format and a non-fallback DCI format for a PUSCH or a PDSCH. A fallback DCI format ma include fixed fields predefined between the BS and the UE, and a non-fallback DCI format may include configurable fields.

The DCI may be channel-coded and modulated and be transmitted via a PDCCH that is a physical DL control channel. A cyclic redundancy check (CRC) may be attached to a payload of a DCI message and scrambled with a Radio Network Temporary Identifier (RNTI) corresponding to an identifier of the UE. Different RNTIs may be used according to purposes of the DCI message, e.g., UE-specific data transmission, a power control command, a random access response (RAR), or the like. In other words, the RNTI is not explicitly transmitted, but is included in a CRC calculation process and transmitted. Upon receiving the DCI message transmitted on the PDCCH, the UE may perform CRC check by using the assigned RNTI, and when a result of the CRC check is correct, the UE may know that the DCI message is transmitted to the UE.

For example, DCI that schedules a PDSCH for system information (SI) may be scrambled by SI-RNTI. DCI for scheduling a PDSCH for a RAR message may be scrambled by RA-RNTI. DCI for scheduling a PDSCH for a paging message may be scrambled by P-RNTI. DCI for notifying a slot format indicator (SFI) may be scrambled by SFI-RNTI. DCI for notifying transmit power control (TPC) may be scrambled by TPC-RNTI. DCI for scheduling a UE-specific PDSCH or PUSCH may be scrambled by Cell RNTI (C-RNTI).

DCI format 0_0 may be used as fallback DCI for scheduling a PUSCH, and in this case, a CRC may be scrambled by C-RNTI. The DCI format 0_0 with the CRC scrambled by the C-RNTI may include, for example, the following pieces of information.

TABLE 6

- Identifier for DCI formats - 1 bit
  - The value of this bit field is always set to 0, indicating an UL DCI format
- Frequency domain resource assignment - $\lceil \log_2(N_{RB}^{UL,BWP}(N_{RB}^{UL,BWP} + 1)/2) \rceil$ bits where $N_{RB}^{UL,BWP}$ is defined in subclause 7.3.1.0
  - For PUSCH hopping with resource allocation type 1:
    - $N_{UL\_hop}$ MSB bits are used to indicate the frequency offset according to Subclause 6.3 of [6, TS 38.214], where $N_{UL\_hop}$ = 1 if the higher layer parameter frequencyHoppingOffsetLists contains two offset values and $N_{UL\_hop}$ = 2 if the higher layer parameter frequencyHoppingOffsetLists contains four offset values
    - $\lceil \log_2(N_{RB}^{UL,BWP}(N_{RB}^{UL,BWP} + 1)/2) \rceil - N_{UL\_hop}$ bits provides the frequency domain resource allocation according to Subclause 6.1.2.2.2 of [6, TS 38.214]
  - For non-PUSCH hopping with resource allocation type 1:
    - $\lceil \log_2(N_{RB}^{UL,BWP}(N_{RB}^{UL,BWP} + 1)/2) \rceil$ bits provides the frequency domain resource allocation according to Subclause 6.1.2.2.2 of [6, TS 38.214]
- Time domain resource assignment- 4 bits as defined in Subclause 6.1.2.1 of [6, TS 38.214]
- Frequency hopping flag - 1 bit according to Table 7.3.1.1.1-3, as defined in Subclause 6.3 of [6, TS 38.214]
- Modulation and coding scheme - 5 bits as defined in Subclause 6.1.4.1 of [6, TS 38.214]
- New data indicator- 1 bit
- Redundancy version - 2 bits as defined in Table 7.3.1.1.1-2
- HARQ process number - 4 bits
- Transmit power control (TPC) command for scheduled PUSCH - 2 bits as defined in Subclause 7.1.1 of [5, TS 38.213]

TABLE 6-continued

- Padding bits, if required.
- UL/Supplementary UL (SUL) indicator - 1 bit for UEs configured with supplementaryUplink in ServingCellConfig in the cell as defined in Table 7.3.1.1.1-1 and the number of bits for DCI format 1_0 before padding is larger than the number of bits for DCI format 0_0 before padding; 0 bit otherwise. The UL/SUL indicator, if present, locates in the last bit position of DCI format 0_0, after the padding bit(s).
    - If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured;
    - If the UL/SUL indicator is not present in DCI format 0_0 and pucch-Config is configured, the corresponding PUSCH scheduled by the DCI format 0_0 is for the UL or SUL for which high layer parameter pucch-Config is configured.
- If the UL/SUL indicator is not present in DCI format 0_0 and pucch-Config is not configured, the corresponding PUSCH scheduled by the DCI format 0_0 is for the uplink on which the latest PRACH is transmitted.

DCI format 0_1 may be used as non-fallback DCI for scheduling a PUSCH, and in this case, a CRC may be scrambled by C-RNTI. The DCI format 0_1 with the CRC scrambled by the C-RNTI may include, for example, the following pieces of information.

TABLE 7

Identifier for DCI formats - 1 bit
The value of this bit field is always set to 0, indicating an UL DCI format
Carrier indicator - 0 or 3 bits, as defined in Subclause 10.1 of [5, TS38.213].
UL/Supplementary UL (SUL) indicator - 0 bit for UEs not configured with supplementaryUplink in ServingCellConfig in the cell or UEs configured with supplementaryUplink in ServingCellConfig in the cell but only PUCCH carrier in the cell is configured for PUSCH transmission; otherwise, 1 bit as defined in Table 7.3.1.1.1-1.
Bandwidth part indicator - 0, 1 or 2 bits as determined by the number of UL BWPs $n_{BWP,RRC}$ configured by higher layers, excluding the initial UL bandwidth part. The bitwidth for this field is determined as $\lceil \log_2 (n_{BWP}) \rceil$ bits, where $n_{BWP} = n_{BWP,RRC} + 1$ if $n_{BWP,RRC} \leq 3$, in which case the bandwidth part indicator is equivalent to the ascending order of the higher layer parameter BWP-Id; otherwise $n_{BWP} = n_{BWP,RRC}$, in which case the bandwidth part indicator is defined in Table 7.3.1.1.2-1;
If a UE does not support active BWP change via DCI, the UE ignores this bit field.
- Frequency domain resource assignment - number of bits determined by the following, where $N_{RB}^{UL,BWP}$ is the size of the active UL bandwidth part:
$N_{RBG}$ bits if only resource allocation type 0 is configured, where $N_{RBG}$ is defined in Subclause 6.1.2.2.1 of [6, TS 38.214],
$\lceil \log_2 (N_{RB}^{UL,BWP} (N_{RB}^{UL,BWP} +1)/2) \rceil$ bits if only resource allocation type 1 is configured, or $\max (\lceil \log_2 (N_{RB}^{UL,BWP} (N_{RB}^{UL,BWP} +1)/2) \rceil, N_{RBG}) + 1$ bits if both resource allocation type 0 and 1 are configured.
If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
For resource allocation type 0, the $N_{RBG}$ LSBs provide the resource allocation as defined in Subclause 6.1.2.2.1 of [6, TS 38.214].
For resource allocation type 1, the $\lceil \log_2 (N_{RB}^{UL,BWP} (N_{RB}^{UL,BWP} +1)/2) \rceil$ LSBs provide the resource allocation as follows:
For PUSCH hopping with resource allocation type 1:
$N_{UL\_hop}$ MSB bits are used to indicate the frequency offset according to Subclause 6.3 of [6, TS 38.214], where $N_{UL\_hop} = 1$ if the higher layer parameter frequencyHoppingOffsetLists contains two offset values and $N_{UL\_hop} = 2$ if the higher layer parameter frequencyHoppingOffsetLists contains four offset values
$\lceil \log_2 (N_{RB}^{UL,BWP} (N_{RB}^{UL,BWP} +1)/2) \rceil - N_{UL\_hop}$ bits provides the frequency domain resource allocation according to Subclause 6.1.2.2.2 of [6, TS 38.214]
For non-PUSCH hopping with resource allocation type 1:
$\lceil \log_2 (N_{RB}^{UL,BWP} (N_{RB}^{UL,BWP} +1)/2) \rceil$ bits provides the frequency domain resource allocation according to Subclause 6.1.2.2.2 of [6, TS 38.214]
If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment"

TABLE 7-continued field of the indicated bandwidth part.
Time domain resource assignment - 0, 1, 2, 3, or 4 bits as defined in Subclause
6.1.2.1 of [6, TS38.214], The bitwidth for this field is determined as $\lceil \log_2 (I) \rceil$
bits, where I is the number of entries in the higher layer parameter pusch-
TimeDomainAllocationList if the higher layer parameter is configured;
otherwise I is the number of entries in the default table.
Frequency hopping flag - 0 or 1 bit:
0 bit if only resource allocation type 0 is configured or if the higher layer
parameter frequencyHopping is not configured;
1 bit according to Table 7.3.1.1.1-3 otherwise, only applicable to resource
allocation type 1, as defined in Subclause 6.3 of [6, TS 38.214].
Modulation and coding scheme - 5 bits as defined in Subclause 6.1.4.1 of [6,
TS 38.214]
New data indicator - 1 bit
Redundancy version - 2 bits as defined in Table 7.3.1.1.1-2
HARQ process number - 4 bits
$1^{st}$ downlink assignment index - 1 or 2 bits:
1 bit for semi-static HARQ-ACK codebook;
2 bits for dynamic HARQ-ACK codebook.
$2^{nd}$ downlink assignment index - 0 or 2 bits:
2 bits for dynamic HARQ-ACK codebook with two HARQ-ACK sub-
codebooks;
0 bit otherwise.
Transmit power control (TPC) command for scheduled PUSCH - 2 bits as
defined in Subclause 7.1.1 of [5, TS38.213]
Sounding reference signal (SRS) resource indicator -

$$-\left\lceil \log_2\left( \sum_{k=1}^{min\{L_{max}, N_{SRS}\}} \binom{N_{SRS}}{k} \right) \right\rceil$$

or $\lceil \log_2 (N_{SRS}) \rceil$ bits, where $N_{SRS}$ is the number of configured SRS resources in the
SRS resource set associated with the higher layer parameter usage of value
'codeBook' or 'nonCodeBook', $$-\left\lceil \log_2\left( \sum_{k=1}^{min\{L_{max}, N_{SRS}\}} \binom{N_{SRS}}{k} \right) \right\rceil$$

bits according to Tables 7.3.1.1.2-28/29/30/31 if the
higher layer parameter txConfig = nonCodebook, where $N_{SRS}$ is the number
of configured SRS resources in the SRS resource set associated with the
higher layer parameter usage of value 'nonCodeBook' and
if UE supports operation with maxMIMO-Layers and the higher layer
parameter maxMIMO-Layers of PUSCH-ServingCellConflg of the serving
cell is configured, $L_{max}$ is given by that parameter
otherwise, $L_{max}$ is given by the maximum number of layers for PUSCH
supported by the UE for the serving cell f or non-codebook based
operation.
$\lceil \log_2(N_{SRS}) \rceil$ bits according to Tables 7.3.1.1.2-32 if the higher layer parameter
txConfig = codebook, where $N_{SRS}$ is the number of configured SRS resources
in the SRS resource set associated with the higher layer parameter usage of
value 'codeBook'.
Precoding information and number of layers - number of bits determined by the
following:
0 bits if the higher layer parameter txConfig = nonCodeBook;
0 bits for 1 antenna port and if the higher layer parameter txConfig =
codebook;
4, 5, or 6 bits according to Table 7.3.1.1.2-2 for 4 antenna ports, if txConfig =
codebook, and according to whether transform precoder is enabled or
disabled, and the values of higher layer parameters maxRank, and
codebookSubset,
2, 4, or 5 bits according to Table 7.3.1.1.2-3 for 4 antenna ports, if txConfig =
codebook, and according to whether transform precoder is enabled or
disabled, and the values of higher layer parameters maxRank, and
codebookSubset,
2 or 4 bits according to Table7.3.1.1.2-4 for 2 antenna ports, if txConfig =
codebook, and according to whether transform precoder is enabled or
disabled, and the values of higher layer parameters maxRank and
codebookSubset,
1 or 3 bits according to Table7.3.1.1.2-5 for 2 antenna ports, if txConfig =
codebook, and according to whether transform precoder is enabled or
disabled, and the values of higher layer parameters maxRank and
codebookSubset.
Antenna ports - number of bits determined by the following
2 bits as defined by Tables 7.3.1.1.2-6, if transform precoder is enabled, dmrs-
Type=1, and maxLength=1;
4 bits as defined by Tables 7.3.1.1.2-7, if transform precoder is enabled, dmrs- TABLE 7-continued Type=1, and maxLength=2;
3 bits as defined by Tables 7.3.1.1.2-8/9/10/11, if transform precoder is
disabled, dmrs-Type=1, and maxLength=1, and the value of rank is
determined according to the SRS resource indicator field if the higher layer
parameter txConfig = nonCodebook and according to the Precoding
information and number of layers field if the higher layer parameter txConfig =
codebook.
4 bits as defined by Tables 7.3.1.1.2-12/13/14/15, if transform precoder is
disabled, dmrs-Type=1, and maxLength=2, and the value of rank is
determined according to the SRS resource indicator field if the higher layer
parameter txConfig = nonCodebook and according to the Precoding
information and number of layers field if the higher layer parameter txConfig =
codebook,
4 bits as defined by Tables 7.3.1.1.2-16/17/18/19, if transform precoder is
disabled, dmrs-Type=2, and maxLength=1, and the value of rank is
determined according to the SRS resource indicator field if the higher layer
parameter txConfig = nonCodebook and according to the Precoding
information and number of layers field if the higher layer parameter txConfig =
codebook,
5 bits as defined by Tables 7.3.1.1.2-20/21/22/23, if transform precoder is
disabled, dmrs-Type=2, and maxLength=2, and the value of rank is
determined according to the SRS resource indicator field if the higher layer
parameter txConfig = nonCodebook and according to the Precoding
information and number of layers field if the higher layer parameter txConfig =
codebook.
where the number of CDM groups without data of values 1, 2, and 3 in Tables
7.3.1.1.2-6 to 7.3.1.1.2-23 refers to CDM groups {0}, {0, 1}, and {0, 1, 2}
respectively.
If a UE is configured with both dmrs-UplinkForPUSCH-MappingTypeA and
dmrs-UplinkForPUSCH-MappingTypeB, the bitwidth of this field equals
$\max\{x_A, x_B\}$, where $x_A$ is the "Antenna ports" bitwidth derived according to
dmrs-UplinkForPUSCH-MappingTypeA and $x_B$ is the "Antenna ports" bitwidth
derived according to dmrs-UplinkForPUSCH-MappingTypeB. A number of
$|x_A - x_B|$ zeros are padded in the MSB of this field, if the mapping type of the
PUSCH corresponds to the smaller value of $x_A$ and $x_B$.
SRS request - 2 bits as defined by Table 7.3.1.1.2-24 for UEs not configured
with supplementaryUplink in ServingCellConfig in the cell; 3 bits for UEs
configured with supplementaryUplink in ServingCellConfig in the cell where
the first bit is the non-SUL/SUL indicator as defined in Table 7.3.1.1.1-1 and
the second and third bits are defined by Table 7.3.1.1.2-24. This bit field may
also indicate the associated CSI-RS according to Subclause 6.1.1.2 of [6, TS
38.214].
Channel state information (CSI) request - 0, 1, 2, 3, 4, 5, or 6 bits determined
by higher layer parameter reportTriggerSize.
Code block group (CBG) transmission information (CBGTI)) - 0 bit if higher
layer parameter codeBlockGroupTransmission for PDSCH is not configured,
otherwise, 2, 4, 6, or 8 bits determined by higher layer parameter
maxCodeBlockGroupsPerTransportBlock for PUSCH.
Phase Tracking reference signal (PTRS)-demodulation reference signal
(DMRS) association - number of bits determined as follows
0 bit if PTRS-UplinkConfig is not configured and transform precoder is
disabled, or if transform precoder is enabled, or if maxRank=1;
2 bits otherwise, where Table 7.3.1.1.2-25 and 7.3.1.1.2-26 are used to
indicate the association between PTRS port(s) and DMRS port(s) for
transmission of one PT-RS port and two PT-RS ports respectively, and the
DMRS ports are indicated by the Antenna ports field.
If "Bandwidth part indicator" field indicates a bandwidth part other than the
active bandwidth part and the "PTRS-DMRS association" field is present for the
indicated bandwidth part but not present for the active bandwidth part, the UE
assumes the "PTRS-DMRS association" field is not present for the indicated
bandwidth part.
beta_offset indicator - 0 if the higher layer parameter betaOffsets = semiStatic',
otherwise 2 bits as defined by Table 9.3-3 in [5, TS 38.213].
DMRS sequence initialization - 0 bit if transform precoder is enabled; 1 bit if
transform precoder is disabled.

TABLE 7-continued

UL data channel (UL-SCH) indicator - 1 bit. A value of "1" indicates UL-SCH shall be transmitted on the PUSCH and a value of "0" indicates UL-SCH shall not be transmitted on the PUSCH. Except for DCI format 0_1 with CRC scrambled by SP-CSI-RNTI, a UE is not expected to receive a DCI format 0_1 with UL-SCH indicator of "0" and CSI request of all zero(s).

DCI format 1_0 may be used as fallback DCI for scheduling a PDSCH, and in this case, a CRC may be scrambled by C-RNTI. The DCI format 1_0 with the CRC scrambled by the C-RNTI may include, for example, the following pieces of information.

TABLE 8

- Identifier for DCI formats - 1 bits
    - The value of this bit field is always set to 1, indicating a DL DCI format
- Frequency domain resource assignment - $\lceil \log_2(N_{RB}^{DL,BWP}(N_{RB}^{DL,BWP} + 1)/2) \rceil$ bits where $N_{RB}^{DL,BWP}$ is given by subclause 7.3.1.0

If the CRC of the DCI format 1_0 is scrambled by C-RNTI and the "Frequency domain resource assignment" field are of all ones, the DCI format 1_0 is for random access procedure initiated by a PDCCH order, with all remaining fields set as follows:
- Random Access Preamble index - 6 bits according to ra-PreambleIndex in Subclause 5.1.2 of [8, TS38.321]
- UL/Supplementary UL (SUL indicator - 1 bit. If the value of the "Random Access Preamble index" is not all zeros and if the UE is configured with supplementaryUplink in ServingCellConfig in the cell, this field indicates which UL carrier in the cell to transmit the PRACH according to Table 7.3.1.1.1-1; otherwise, this field is reserved
- Synchronization signal (SS)/broadcast channel (physical broadcast channel (PBCH)) index - 6 bits. If the value of the "Random Access Preamble index" is not all zeros, this field indicates the SS/PBCH that shall be used to determine the RACH occasion for the PRACH transmission; otherwise, this field is reserved.
- Physical random access channel (PRACH) mask index - 4 bits. If the value of the "Random Access Preamble index" is not all zeros, this field indicates the RACH occasion associated with the SS/PBCH indicated by "SS/PBCH index" for the PRACH transmission, according to Subclause 5.1.1 of [8, TS38.321]; otherwise, this field is reserved
- Reserved bits - 10 bits Otherwise, all remaining fields are set as follows:
- Time domain resource assignment - 4 bits as defined in Subclause 5.1.2.1 of [6, TS 38.214]
- Virtual resource block (VRB)-to-physical resource block (PRB) mapping - 1 bit according to Table 7.3.1.2.2-5
- Modulation and coding scheme - 5 bits as defined in Subclause 5.1.3 of [6, TS 38.214]
- New data indicator - 1 bit
- Redundancy version - 2 bits as defined in Table 7.3.1.1.1-2
- HARQ process number - 4 bits
- Downlink assignment index - 2 bits as defined in Subclause 9.1.3 of [5, TS 38.213], as counter DAI
- Transmit power control (TPC) command for scheduled PUCCH - 2 bits as defined in Subclause 7.2.1 of [5, TS 38.213]
- PUCCH resource indicator - 3 bits as defined in Subclause 9.2.3 of [5, TS 38.213]
- PDSCH-to-HARQ_feedback timing indicator - 3 bits as defined in Subclause 9.2.3 of [5, TS38.213]

DCI format 1_1 may be used as non-fallback DCI for scheduling a PDSCH, and in this case, a CRC may be scrambled by C-RNTI. The DCI format 1_1 with the CRC scrambled by the C-RNTI may include, for example, the following pieces of information.

TABLE 9

- Identifier for DCI formats - 1 bits
    - The value of this bit field is always set to 1, indicating a DL DCI format
- Carrier indicator - 0 or 3 bits as defined in Subclause 10.1 of [5, TS 38.213].
- Bandwidth part indicator - 0, 1 or 2 bits as determined by the number of DL BWPs $n_{BWP,RRC}$ configured by higher layers, excluding the initial DL bandwidth part. The bitwidth for this field is determined as $\lceil \log_2 (n_{BWP}) \rceil$ bits, where

TABLE 9-continued

- $n_{BWP} = n_{BWP,RRC} + 1$ if $n_{BWP,RRC} \leq 3$, in which case the bandwidth part indicator is equivalent to the ascending order of the higher layer parameter BWP-Id;
- otherwise $n_{BWP} = n_{BWP,RRC}$, in which case the bandwidth part indicator is defined in Table 7.3.1.1.2-1;

If a UE does not support active BWP change via DCI, the UE ignores this bit field.
- Frequency domain resource assignment - number of bits determined by the following, where $N_{RB}^{DL,BWP}$ is the size of the active DL bandwidth part:
  - $N_{RBG}$ bits if only resource allocation type 0 is configured, where $N_{RBG}$ is defined in Subclause 5.1.2.2.1 of [6, TS38.214],
  - $\lceil \log_2 ( N_{RB}^{DL,BWP} ( N_{RB}^{DL,BWP} + 1 ) / 2 ) \rceil$ bits if only resource allocation type 1 is configured, or
  - $\max ( \lceil \log_2 ( N_{RB}^{DL,BWP} ( N_{RB}^{DL,BWP} + 1 ) / 2 ) \rceil , N_{RBG} ) + 1$ bits if both resource allocation type 0 and 1 are configured.
  - If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
  - For resource allocation type 0, the $N_{RBG}$ LSBs provide the resource allocation as defined in Subclause 5.1.2.2.1 of [6, TS 38.214].
  - For resource allocation type 1, the $\lceil \log_2 ( N_{RB}^{DL,BWP} ( N_{RB}^{DL,BWP} + 1 ) / 2 ) \rceil$ LSBs provide the resource allocation as defined in Subclause 5.1.2.2.2 of [6, TS 38.214].

If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.
- Time domain resource assignment - 0, 1, 2, 3, or 4 bits as defined in Subclause 5.1.2.1 of [6, TS 38.214], The bitwidth for this field is determined as $\lceil \log_2 (I) \rceil$ bits, where I is the number of entries in the higher layer parameter pdsch-TimeDomainAllocationList if the higher layer parameter is configured; otherwise I is the number of entries in the default table.
- Virtual resource block (VRB-to-physical resource block (PRB) mapping - 0 or 1 bit:
  - 0 bit if only resource allocation type 0 is configured or if interleaved VRB-to-PRB mapping is not configured by high layers;
  - 1 bit according to Table 7.3.1.2.2-5 otherwise, only applicable to resource allocation type 1, as defined in Subclause 7.3.1.6 of [4, TS 38.211].
- PRB bundling size indicator - 0 bit if the higher layer parameter prb-BundlingType is not configured or is set to 'static', or 1 bit if the higher layer parameter prb-BundlingType is set to 'dynamic' according to Subclause 5.1.2.3 of [6, TS 38.214].
- Rate matching indicator - 0, 1, or 2 bits according to higher layer parameters rateMatchPatternGroup1 and rateMatchPatternGroup2, where the MSB is used to indicate rateMatchPatternGroup1 and the LSB is used to indicate rateMatchPatternGroup2 when there are two groups.
- Zero power (ZP) channel state information (CSI)-reference signal (RS) trigger - 0, 1, or 2 bits as defined in Subclause 5.1.4.2 of [6, TS 38.214]. The bitwidth for this field is determined as $\lceil \log_2 (n_{ZP} + 1) \rceil$ bits, where $n_{ZP}$ is the number of aperiodic ZP CSI-RS resource sets configured by higher layer.

For transport block 1:
- Modulation and coding scheme - 5 bits as defined in Subclause 5.1.3.1 of [6, TS 38.214]
- New data indicator - 1 bit
- Redundancy version - 2 bits as defined in Table 7.3.1.1.1-2

For transport block 2 (only present if maxNrofCodeWordsScheduledByDCI equals 2):
- Modulation and coding scheme - 5 bits as defined in Subclause 5.1.3.1 of [6, TS 38.214]
- New data indicator - 1 bit
- Redundancy version - 2 bits as defined in Table 7.3.1.1.1-2

If "Bandwidth part indicator" field indicates a bandwidth part other than the active bandwidth part and the value of maxNrofCodeWordsScheduledByDCI for the indicated bandwidth part equals 2 and the value of maxNrofCodeWordsScheduledByDCI for the active bandwidth part equals 1, the UE assumes zeros are padded when interpreting the "Modulation and coding scheme", "New data indicator", and "Redundancy version" fields of transport block 2 according to Subclause 12 of [5, TS38.213], and the UE ignores the "Modulation and coding scheme", "New data indicator", and "Redundancy version" fields of transport block 2 for the indicated bandwidth part.
- HARQ process number - 4 bits
- Downlink assignment index - number of bits as defined in the following
  - 4 bits if more than one serving cell are configured in the DL and the higher layer parameter pdsch-HARQ-ACK-Codebook=dynamic, where the 2 MSB bits are the counter DAI and the 2 LSB bits are the total DAI;

TABLE 9-continued

- 2 bits if only one serving cell is configured in the DL and the higher layer
  parameter pdsch-HARQ-ACK-Codebook=dynamic, where the 2 bits are the
  counter DAI;
- 0 bits otherwise.
- Transmit power control (TPC) command for scheduled PUCCH - 2 bits as
  defined in Subclause 7.2.1 of [5, TS 38.213]
- PUCCH resource indicator - 3 bits as defined in Subclause 9.2.3 of [5, TS
  38.213]
- PDSCH-to-HARQ_feedback timing indicator - 0, 1, 2, or 3 bits as defined in
  Subclause 9.2.3 of [5, TS 38.213]. The bitwidth for this field is determined as
  $\lceil \log_2 (I) \rceil$ bits, where I is the number of entries in the higher layer parameter dl-
  DataToUL-ACK.
- Antenna port(s) - 4, 5, or 6 bits as defined by Tables 7.3.1.2.2-1/2/3/4, where
  the number of CDM groups without data of values 1, 2, and 3 refers to CDM
  groups {0}, {0,1}, and {0, 1,2} respectively. The antenna ports $\{p_0,...,p_{v-1}\}$ shall
  be determined according to the ordering of DMRS port(s) given by Tables
  7.3.1.2.2-1/2/3/4.
  If a UE is configured with both dmrs-DownlinkForPDSCH-MappingTypeA
  and dmrs-DownlinkForPDSCH-MappingTypeB, the bitwidth of this field
  equals max$\{x_A, x_B\}$, where $x_A$ is the "Antenna ports" bitwidth derived according
  to dmrs-DownlinkForPDSCH-MappingTypeA and $x_B$ is the "Antenna ports"
  bitwidth derived according to dmrs-DownlinkForPDSCH-MappingTypeB. A
  number of $|x_A - x_B|$ zeros are padded in the MSB of this field, if the mapping
  type of the PDSCH corresponds to the smaller value of $x_A$ and $x_B$.
- Transmission configuration indication - 0 bit if higher layer parameter tci-
  PresentInDCI is not enabled; otherwise 3 bits as defined in Subclause 5.1.5 of
  [6, TS38.214].
  If "Bandwidth part indicator" field indicates a bandwidth part other than the
  active bandwidth part,
  - if the higher layer parameter tci-PresentInDCI is not enabled for the
    CORESET used for the PDCCH carrying the DCI format 1_1,
    - the UE assumes tci-PresentInDCI is not enabled for all CORESETs in
      the indicated bandwidth part;
  - otherwise,
    - the UE assumes tci-PresentInDCI is enabled for all CORESETs in the
      indicated bandwidth part.
- SRS request - 2 bits as defined by Table 7.3.1.1.2-24 for UEs not configured
  with supplementaryUplink in ServingCellConfig in the cell; 3 bits for UEs
  configured with supplementaryUplink in ServingCellConfig in the cell where
  the first bit is the non-SUL/SUL indicator as defined in Table 7.3.1.1.1-1 and
  the second and third bits are defined by Table 7.3.1.1.2-24. This bit field may
  also indicate the associated CSI-RS according to Subclause 6.1.1.2 of [6, TS
  38.214].
- Code block group (CBG) transmission information (CBGTI) - 0 bit if higher
  layer parameter codeBlockGroupTransmission for PDSCH is not configured,
  otherwise, 2, 4, 6, or 8 bits as defined in Subclause 5.1.7 of [6, TS38.214],
  determined by the higher layer parameters
  maxCodeBlockGroupsPerTransportBlock and
  maxNrofCodeWordsScheduledByDCI for the PDSCH.
- CBG flushing out information (CBGFI) - 1 bit if higher layer parameter
  codeBlockGroupFlushIndicator is configured as "TRUE", 0 bit otherwise.
- Demodulation reference signal (DMRS) sequence initialization - 1 bit.

Hereinafter, a method of allocating time domain resources for a data channel in a 5G wireless communication system is described.

The BS may configure, via higher layer signaling (e.g., RRC signaling), the UE with a table of time domain resource allocation information for a DL data channel (PDSCH) and a UL data channel (PUSCH). A table including a maximum of 16 entries (maxNrofDL-Allocations=16) may be configured for a PDSCH, and a table including a maximum of 16 entries (maxNrofUL-Allocations=16) may be configured for a PUSCH. The time domain resource allocation information may include a PDCCH-to-PDSCH slot timing (denoted by K0 and corresponding to a slot time interval between a time point when a PDCCH is received and a time point when a PDSCH scheduled by the received PDCCH is transmitted), a PDCCH-to-PUSCH slot timing (denoted by K2 and corresponding to a slot time interval between a time point when a PDCCH is received and a time point when a PUSCH scheduled by the received PDCCH is transmitted), information about a location of a start symbol where the PDSCH or the PUSCH is scheduled within a slot and a length of the scheduled PDSCH or PUSCH, a mapping type of the PDSCH or PUSCH, etc. For example, the BS may notify the UE of information as shown in Tables below.

TABLE 10

PDSCH-TimeDomainResourceAllocationList information element

PDSCH-TimeDomainResourceAllocationList  ::=  SEQUENCE
(SIZE(1..maxNrofDL-Allocations)) OF
PDSCH-TimeDomainResourceAllocation
PDSCH-TimeDomainResourceAllocation ::=  SEQUENCE {
   k0      INTEGER(0..32)      OPTIONAL, -- NeedS
  (PDCCH-to-PDSCH timing,slot unit)
    mappingType     ENUMERATED {typeA, typeB},
  (PDSCH mapping type)
    startSymbolAndLength    INTEGER (0..127)
  (Start symbol and length of PDSCH)
}

TABLE 11

PUSCH-TimeDomainResourceAllocation information element

PUSCH-TimeDomainResourceAllocationList ::=  SEQUENCE
(SIZE(1..maxNrofUL-Allocations)) OF
PUSCH-TimeDomainResourceAllocation
PUSCH-TimeDomainResourceAllocation ::=  SEQUENCE {
    k2        INTEGER(0..32)    OPTIONAL, -- NeedS
    (PDCCH-to-PUSCH timing, slot unit)
    mappingType       ENUMERATED {typeA, typeB},
    (PUSCH mapping type)
    startSymbolAndLength    INTEGER (0..127)
    (Start symbol and length of PUSCH)
}

The BS may notify the UE of one of the entries in the table of the time domain resource allocation information via L1 signaling (e.g., DCI) (e.g., by indicating the entry via a 'time domain resource assignment' field in the DCI). The UE may obtain the time domain resource allocation information for the PDSCH or PUSCH based on the DCI received from the BS.

A method of allocating frequency domain resources for a data channel in a 5G wireless communication system is now described.

In the 5G wireless communication system, two types, i.e., resource allocation type 0 and resource allocation type 1, are supported as a method of indicating frequency domain resource allocation information for a PDSCH and a PUSCH.

Resource Allocation Type 0

RB allocation information may be notified from the BS to the UE in the form of a bitmap for a RB group (RBG). At this time, the RBG may consist of a set of consecutive virtual RBs (VRBs), and a size P of the RBG may be determined based on a value configured by a higher layer parameter rbg-Size and a size of a BWP defined in Table 12 below.

TABLE 12

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

A total number $N_{RBG}$ of RBGs for BWP i of size $N_{BWP,i}^{size}$ may be defined by $N_{RBG} = \lceil (N_{BWP,i}^{size} + (N_{BWP,i}^{start} \mod P))/P \rceil$, where where
the size of the first RBG is $RBG_0^{size} = P - N_{BWP,i}^{start} \mod P$,
at the size of last RBG is $RBG_{last}^{size} = (N_{BWP,i}^{start} + N_{BWP,i}^{size}) \mod P$ if $(N_{BWP,i}^{start} + N_{BWP,i}^{size}) \mod P > 0$ and P otherwise,
the size of all other RBGs is P.

Each bit in the bitmap with a size of $N_{RBG}$ bits may correspond to a RBG. RBGs may be indexed in the order of increasing frequency, starting from a lowest frequency location of the BWP. For $N_{RBG}$ RBGs in the BWP, RBG #0 to RBG #$N_{RBG}-1$ may be mapped from a most significant bit (MSB) to a least significant bit (LSB) of the RBG bitmap. When a specific bit value in the bitmap is 1, the UE may determine that an RBG corresponding to the corresponding bit value is allocated thereto, and when the specific bit value in the bitmap is 0, the UE may determine that an RBG corresponding to the corresponding bit value is not allocated thereto.

Resource Allocation Type 1

RB allocation information may be notified from the BS to the UE as information about a starting location and a length of consecutively allocated VRBs. In this case, interleaving or non-interleaving may be additionally applied to the consecutively allocated VRBs. In the resource allocation type 1, a resource allocation field may consist of a resource indication value (RIV) including a starting VRB $RB_{start}$ and a length $L_{RBs}$ of the consecutively allocated RBs. In detail, the RIV in the BWP with the size of $N_{BWP}^{size}$ may be defined as follows:

if $(L_{RBs}-1) \leq \lfloor N_{BWP}^{size}/2 \rfloor$ then $RIV = N_{BWP}^{size}(L_{RBs}-1) + RB_{start}$ else $RIV = N_{BWP}^{size}(N_{BWP}^{size} - L_{RBs}+1) + (N_{BWP}^{size}-1-RB_{start})$ where $L_{RBs} \geq 1$ and shall not exceed $N_{BWP}^{size} - RB_{start}$.

A DL control channel in a 5G communication system is now described in detail with reference to FIG. 4.

Figure 4:
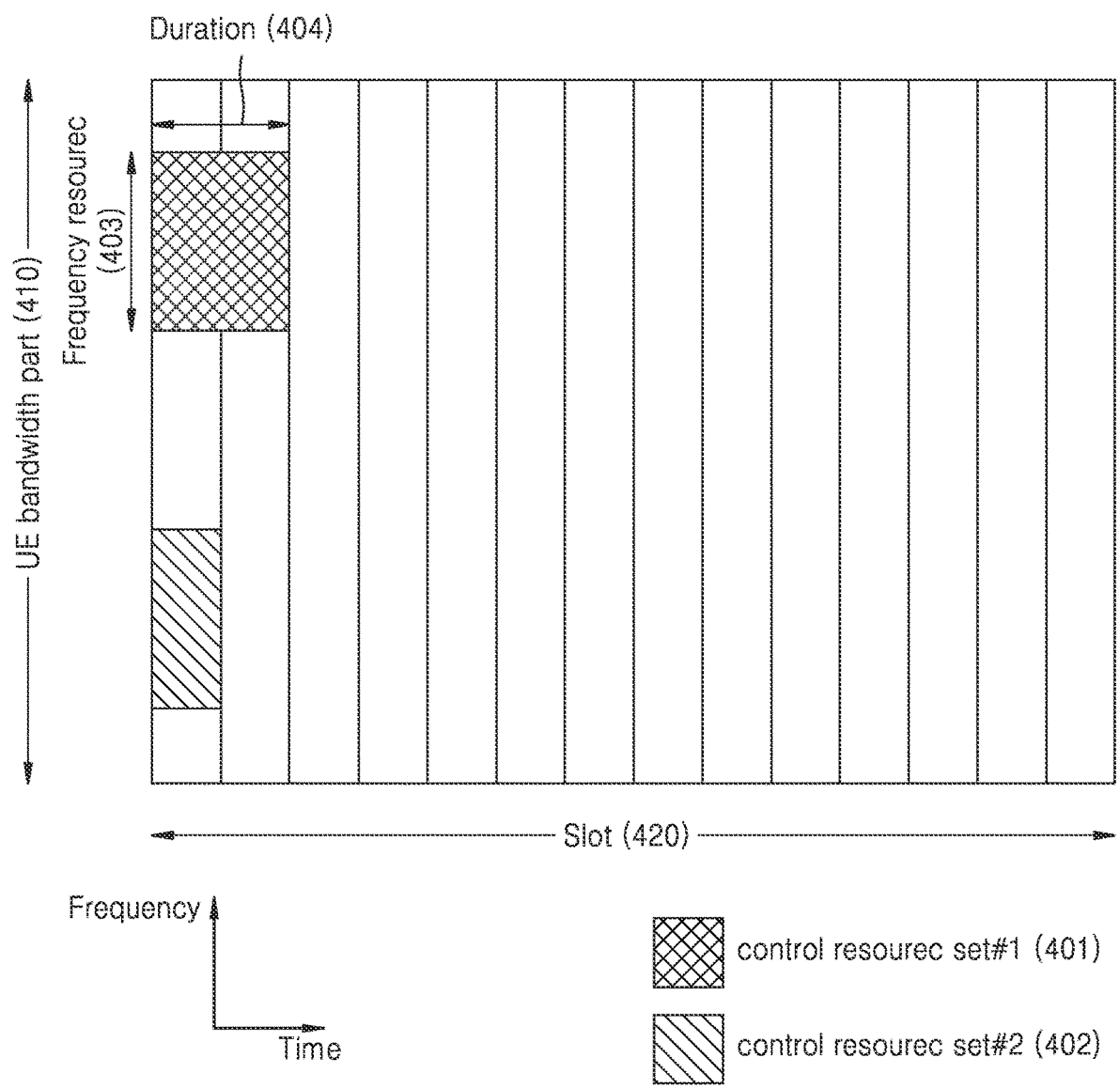
FIG. 4 illustrates an example of a control resource set (CORESET) in which a downlink control channel is transmitted in a 5G wireless communication system.

FIG. 4 illustrates an example of a CORESET in which a DL control channel is transmitted in a 5G wireless communication system.

FIG. 4 shows an example in which two CORESETs, i.e., CORESET #1 401 and CORESET #2 402, are configured in a UE BWP 410 on a frequency axis and in one slot 420 on a time axis. The CORESETs 401 and 402 may be configured in a particular frequency resource 403 within the entire UE BWP 410 on the frequency axis. The CORESETs 401 and 402 may be configured with one or a plurality of OFDM symbols, which may be defined as a CORESET duration 404. Referring to the example of FIG. 4, the CORESET #1 401 may be configured with a CORESET duration of 2 symbols, and the CORESET #2 402 may be configured with a CORESET duration of 1 symbol.

In the 5G wireless communication system, a BS may configure the UE with a CORESET via higher layer signaling (e.g., SI, MIB, or RRC signaling). Configuring the UE with the CORESET means providing the UE with information such as a CORESET identity, a frequency location of the CORESET, a symbol length of the CORESET, etc. For example, pieces of information provided for configuring a CORESET are listed as follows.

TABLE 13

ControlResourceSet ::=                SEQUENCE {
    -- Corresponds to L1 parameter 'CORESET-ID'
    controlResourceSetId        ControlResourceSetId,
(Identity of control resource set)
    frequencyDomainResources    BIT STRING (SIZE (45)),
(Frequency-axis resource allocation information)

TABLE 13-continued

| | |
|---|---|
| duration<br>(Time-axis resource allocation information) | INTEGER (1..maxCoReSetDuration), |
| cce-REG-MappingType<br>(CCE-to-REG mapping type) | CHOICE { |
| interleaved | SEQUENCE { |
| reg-BundleSize<br>(REG bundle size) | ENUMERATED {n2, n3, n6}, |
| precoderGranularity<br>bundle, allContiguousRBs}, | ENUMERATED {sameAsREG- |
| interleaverSize<br>(Interleaver size) | ENUMERATED {n2, n3, n6} |
| shiftIndex<br>INTEGER(0..maxNrofPhysicalResourceBlocks-<br>1)<br>(Interleaver shift) | OPTIONAL |
| },<br>nonInterleaved<br>}, | NULL |
| tci-StatesPDCCH<br>StatesPDCCH)) OF TCI-StateId<br>(QCL configuration information) | SEQUENCE(SIZE (1..maxNrofTCI-<br>OPTIONAL, |
| tci-PresentInDCI<br>{enabled}<br>Need S<br>} | ENUMERATED<br>OPTIONAL, -- |

In the 5G wireless communication system, a CORESET may consist of $N_{RB}^{CORESET}$ RBs in the frequency domain and $N_{symb}^{CORESET} \in \{1,2,3\}$ symbols in the time domain. A control channel element (CCE) may consist of 6 REGs, and a REG may be defined as 1 RB during one OFDM symbol. In a CORESET, REGs may be indexed in a time-first manner starting at RGB index 0 for a first OFDM symbol and a lowest-numbered RB in the CORESET.

The 5G wireless communication system supports an interleaved method and a non-interleaved method as a PDCCH transmission method. The BS may configure, via higher layer signaling, the UE with whether a transmission type is interleaved or non-interleaved for each CORESET. Interleaving may be performed in units of REG bundles. A REG bundle may be defined as a set of one or a plurality of REGs. The UE may determine a CCE-to-REG mapping type for a corresponding CORESET in the following manner, based on whether the transmission type is interleaved or non-interleaved as configured by the BS.

TABLE 14

The CCE-to-REG mapping for a control-resource set can be interleaved or non-interleaved and is described by REG bundles:
- REG bundle i is defined as REGs {iL,iL +1,...,iL + L −1} where L is the REG bundle size, i = 0,1 ... , $N_{REG}^{CORESET}$ / L − 1, and $N_{REG}^{CORESET} = N_{RB}^{CORESET} N_{symb}^{CORESET}$ is the number of REGs in the CORESET
- CCE j consist of REG bundles { f (6 j / L), f (6 j / L + 1),..., f (6 j / L + 6/ L −1)} where f (•) is an interleaver
For non-interleaved CCE-to-REG mapping, L = 6 and f (x) = x.
For interleaved CCE-to-REG mapping, L ∈ {2,6}for $N_{symb}^{CORESET}$ = 1 and L ∈ {$N_{symb}^{CORESET}$, 6} for $N_{symb}^{CORESET}$ ∈ {2,3}. The interleaver is defined by
$f(x) = (rC + c + n_{shift}) \mod (N_{REG}^{CORESET} / L)$
$x = cR + r$
$r = 0,1, ... , R − 1$
$c = 0,1, ... , C − 1$
$C = N_{REG}^{CORESET} / (LR)$
where R ∈ {2,3,6}.

A search space in a 5G communication system is now described in more detail with reference to FIG. 5.

Figure 5:
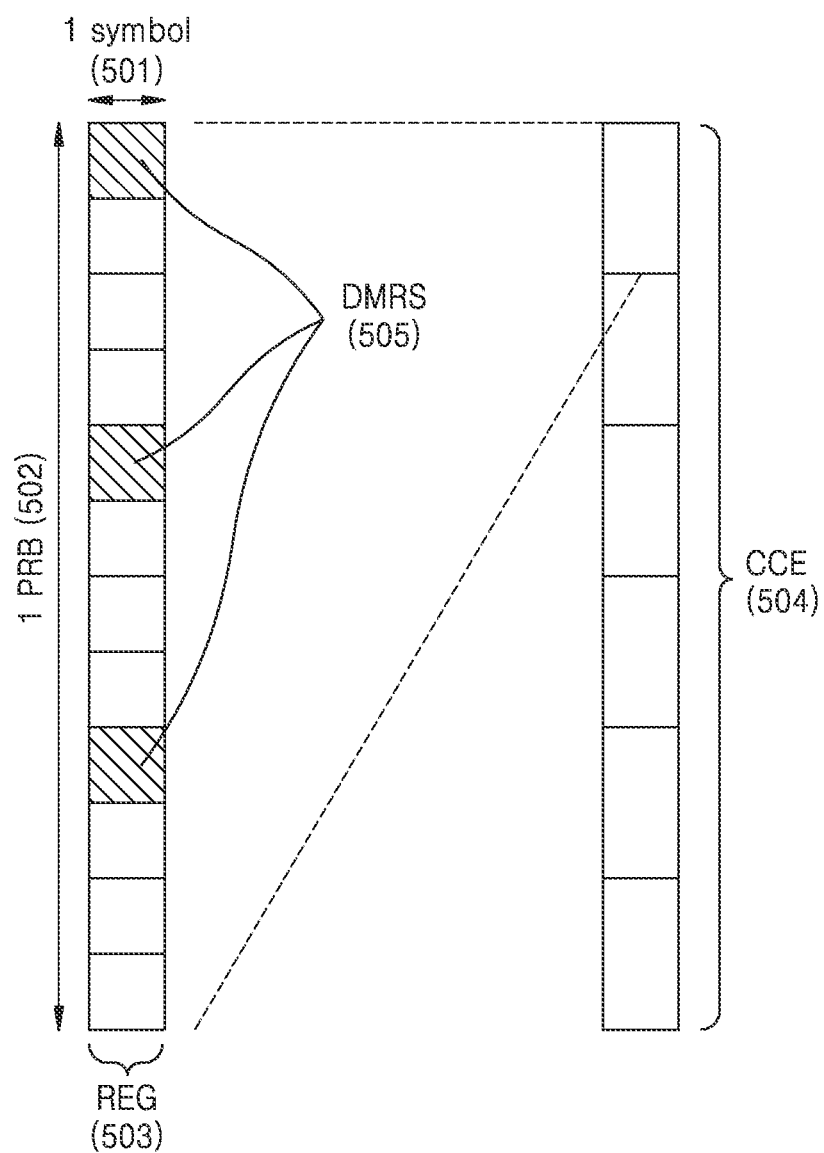
FIG. 5 illustrates an example of basic units of time and frequency resources constituting a downlink control channel that can be used in a 5G wireless communication system.

FIG. 5 illustrates an example of basic units of time and frequency resources constituting a DL control channel that can be used in a 5G wireless communication system.

A basic unit of the DL control channel shown in FIG. 5, i.e., a REG 503, may all include REs to which DCI is mapped and a region to which a DMRS 505, which is a reference signal for decoding the REs, is mapped. As illustrated in FIG. 5, for example, three DMRSs 505 may be transmitted in one REG 503. The number of CCEs required to transmit a PDCCH may be 1, 2, 4, 8, or 16 depending on an AL, and a different number of CCEs may be used to implement link adaptation of a DL control channel. For example, when AL=L, one DL control channel may be transmitted using L CCEs. The UE is required to detect a signal as it does not know information about a DL control channel, and a search space representing a set of CCEs is defined for blind decoding. The search space is a set of DL control channel candidates, each candidate being composed of CCEs, intended for the UE to attempt to decode at a given AL, and because there are various ALs respectively corresponding to sets of 1, 2, 4, 8, and 16 CCEs, the UE may have a plurality of search spaces. A search space set may be defined as a set of search spaces at all configured ALs.

The search space may be classified into a common search space and a UE-specific search space. A particular group of UEs or all UEs may monitor a PDCCH common search space in order to receive cell-common control information such as dynamic scheduling of SI or paging messages. For example, scheduling allocation information for a PDSCH for transmission of a SIB including cell operator information, etc. may be received by monitoring the PDCCH common search space. Because a particular group of UEs or all UEs need to receive a PDCCH in the common search space, the common search space may be defined as a predetermined set of CCEs. The scheduling allocation information for a UE-specific PDSCH or PUSCH may be received by monitoring a UE-specific PDCCH search space. The UE-specific search space may be defined in a UE-specific manner, based on the identity of the UE and a function of various system parameters.

In the 5G wireless communication system, parameters for a PDCCH search space may be configured for the UE by the BS via higher layer signaling (e.g., SIB, MIB, RRC signaling). For example, the BS may configure the UE with the number of PDCCH candidates at each AL L, a monitoring periodicity for a search space, monitoring occasions in symbols within slots for the search space, a search space type (a common search space or a UE-specific search space), a combination of DCI format and RNTI to be monitored in the search space, and an index of a CORESET in which the search space is to be monitored. For example, parameters for a PDCCH search space may include the following pieces of information.

TABLE 15

```
SearchSpace ::=            SEQUENCE {
    -- Identity of the search space. SearchSpaceId = 0 identifies the SearchSpace
       configured via PBCH (MIB) or ServingCellConfigCommon.
    searchSpaceId                  SearchSpaceId,
    (Identity of search space)
    controlResourceSetId           ControlResourceSetId,
    (Identity of control resource set)
    monitoringSlotPeriodicityAndOffset   CHOICE {
    (Monitoring slot level periodicity)
        sl1                        NULL,
        sl2                        INTEGER (0..1),
        sl4                        INTEGER (0..3),
        sl5                        INTEGER (0..4),
        sl8                        INTEGER (0..7),
        sl10                       INTEGER (0..9),
        sl16                       INTEGER (0..15),
        sl20                       INTEGER (0..19)
    }
            OPTIONAL,
    duration(Monitoring duration)  INTEGER (2..2559)
        monitoringSymbolsWithinSlot        BIT    STRING    (SIZE
        (14))                              OPTIONAL,
    (Monitoring symbols within slot)
        nrofCandidates             SEQUENCE {
    (Number of PDCCH candidates per aggregation level)
        aggregationLevel1          ENUMERATED {n0, n1, n2, n3, n4,
        n5, n6, n8},
        aggregationLevel2          ENUMERATED {n0, n1, n2, n3, n4,
        n5, n6, n8},
        aggregationLevel4          ENUMERATED {n0, n1, n2, n3, n4,
        n5, n6, n8},
        aggregationLevel8          ENUMERATED {n0, n1, n2, n3, n4,
        n5, n6, n8},
        aggregationLevel16         ENUMERATED {n0, n1, n2, n3, n4,
        n5, n6, n8}
    },
    searchSpaceType                CHOICE {
    (Search space type)
        -- Configures this search space as common search space (CSS) and DCI
           formats to monitor.
        common                     SEQUENCE {
        (Common search space)
    }
        ue-Specific                SEQUENCE {
        (UE-specific search space)
            -- Indicates whether the UE monitors in this USS for DCI formats 0-0 and
            1-0 or for formats 0-1 and 1-1.
            formats                        ENUMERATED {formats0-0-
            And-1-0, formats0-1-And-1-1},
            ...
        }
```

Depending on the configuration information, the BS may configure the UE with one or a plurality of search space sets. According to some embodiments, the BS may configure the UE with search space set 1 and search space set 2. For the search space set 1, the UE may be configured to monitor a DCI format A scrambled with X-RNTI in a common search space, and for the search space set 2, the UE may be configured to monitor a DCI format B scrambled with Y-RNTI in a UE-specific search space.

According to the configuration information, one or a plurality of search space sets may exist in the common search space or the UE-specific search space. For example, search space set #1 and search space set #2 may be config- ured as a common search space, and search space set #3 and search space set #4 may be configured as a UE-specific search space.

The following combinations of DCI formats and RNTIs may be monitored in the common search space. However, the combinations are not limited to an example set forth below.

DCI format 0_0/1_0 with CRC scrambled by C-RNTI, CS-RNTI, SP-CSI-RNTI, RA-RNTI, TC-RNTI, P-RNTI, SI-RNTI
DCI format 2_0 with CRC scrambled by SFI-RNTI
DCI format 2_1 with CRC scrambled by INT-RNTI
DCI format 2_2 with CRC scrambled by TPC-PUSCH-RNTI, TPC-PUCCH-RNTI
DCI format 2_3 with CRC scrambled by TPC-SRS-RNTI The following combinations of DCI formats and RNTIs may be monitored in the user-specific search space. However, the combinations are not limited to an example set forth below.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The RNTIs specified above may comply with the following definitions and use cases.

Cell RNTI (C-RNTI): for scheduling a UE-specific PDSCH

Temporary Cell RNTI (TC-RNTI): for scheduling a UE-specific PDSCH.

Configured Scheduling RNTI (CS-RNTI): for scheduling a semi-statically configured UE-specific PDSCH Random Access RNTI (RA-RANTI): for scheduling a PDSCH during a random access phase Paging RNTI (P-RNTI): for scheduling a PDSCH that carries paging information System Information RNTI (SI-RNTI): for scheduling a PDSCH that carries SI Interruption RNTI (INT-RNTI): for notifying whether to puncture a PDSCH Transmit Power Control for PUSCH RNTI (TPC-PUSCH-RNTI): for indicating a power control command for a PUSCH Transmit Power Control for PUCCH RNTI (TPC-PUCCH-RNTI): for indicating a power control command for a PUCCH Transmit Power Control for SRS RNTI (TPC-PUCCH-RNTI): for indicating a power control command for SRS The DCI formats specified above may be defined as follows.

TABLE 16

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G wireless communication system, a search space at an aggregation level L in a CORESET p and a search space set s may be expressed by Equation (1) below.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p}/L \rfloor \right\} + i \quad \text{Equation 1}$$

$L$ : aggregation level $n_{CI}$ : carrier index $N_{CCE,p}$ : total number of CCEs in CORESET p $n_{s,f}^\mu$ : slot index $M_{p,s,max}^{(L)}$ :

number of PDCCH candidates at aggregation level L $m_{snCI} = 0, \ldots ,$ $M_{p,s,max}^{(L)} - 1$ : PDCCH candidate indexes $i = 0, \ldots , L - 1$ $$Y_{p,n_{s,f}^\mu} = \left( A_p \cdot Y_{p,n_{s,f}^\mu} - 1 \right) \mod D,$$

$Y_{p,-1} = n_{RNTI} \neq 0, A_0 = 39827,$ $A_1 = 39829, A_2 = 39839, D = 65537$ $n_{RNTI}$ : UE identity For common search space, $Y_-(p, n_{s,f}^\mu)$ value may correspond to 0.

For UE-specific search space, $Y_-(p, n_{s,f}^\mu)$ value may correspond to a value that varies according to identity of UE(C-RNTI or ID configured by BS for UE) and time index.

Next, a grant-free (which may be alternatively referred to as configured scheduling or configured grant) data transmission and reception scheme in a 5G wireless communication system is described. In a grant-based transmission and reception scheme, to transmit and receive a data channel, the UE may first obtain scheduling information for a DL or UL control channel from DCI received by monitoring a DL control channel and then perform transmission and reception of the data channel based on the corresponding scheduling information. On the other hand, in a grant-free transmission and reception scheme, the UE may receive scheduling information preconfigured or indicated by the BS for transmitting and receiving a data channel and perform transmission and reception of the data channel based on the preconfigured scheduling information. In other words, in the grant-free transmission and reception scheme, the UE may perform transmission and reception of the data channel without monitoring a DL control channel. In this case, the grant-free transmission and reception of the data channel may be applied only to initial transmission.

Figure 6:
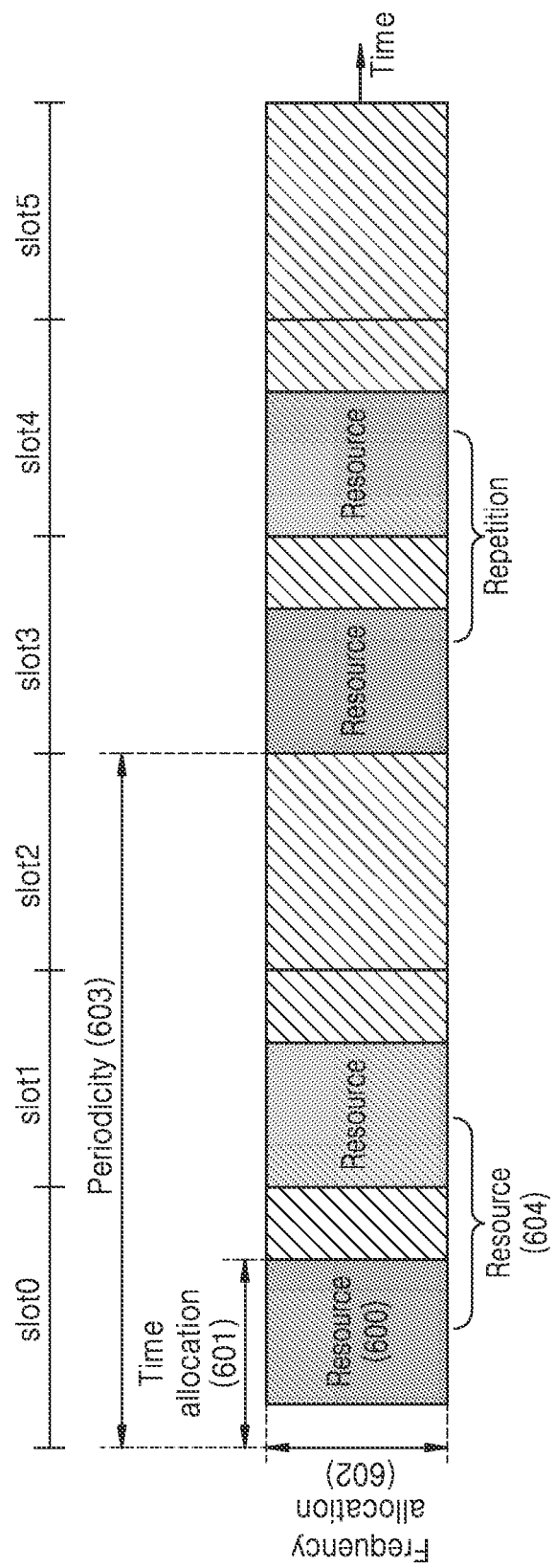
FIG. 6 illustrates an example of grant-free transmission in a 5G wireless communication system.

In detail, in order to support grant-free transmission and reception for a PDSCH or PUSCH, the BS may configure the UE with all or some of time and frequency transmission resources and various transmission and reception parameters for the PDSCH and PUSCH via higher layer signaling and/or L1 signaling. For example, as shown in FIG. 6, time domain allocation information 601, frequency domain allocation information 602, periodicity information 603, etc., for resources 600 may be configured via higher layer signaling. Furthermore, the BS may configure the UE with various parameters for PDSCH or PUSCH transmission and reception (e.g., frequency hopping, DMRS configuration, a MCS table, a MCS, a RBG size, the number of repetitions, a redundancy version (RV), etc.) via higher layer signaling or L1 signaling. The UE may perform reception of PDSCH or transmission of PUSCH based on the configured scheduling information.

In detail, for the purpose of supporting DL semi-persistent scheduling (SPS), the BS may configure the UE with the following pieces of information via higher layer signaling (e.g., RRC signaling).

TABLE 17

| |
|---|
| SPS-Config ::=   SEQUENCE { |
| periodicity (Transmission periodicity)   ENUMERATED {ms10, ms20, ms32, ms40, ms64, ms80, ms128, ms160, ms320, ms640, spare6, spare5, spare4, spare3, spare2, spare1}, |
| nrofHARQ-Processes (HARQ process number)   INTEGER (1..8), |
| n1PUCCH-AN (HARQ transmission resources)   PUCCH-ResourceId OPTIONAL, -- Need M |
| mcs-Table (MCS table)   ENUMERATED {qam64LowSE}   OPTIONAL, -- Need S |
| ... |
| } |

In addition to the above-described configuration information, scheduling information related to the PDSCH (e.g., information corresponding to all or some of the pieces of scheduling information in the DCI format that can be used for scheduling the PDSCH (see Tables 8 and 9)) may be transmitted to the UE via DCI (DCI transmitted for activating DL SPS). The DL SPS may be configured in a primary cell or a secondary cell and in one cell within a cell group.

For the grant-free (which may be alternatively referred to as configured scheduling or configured grant scheduling) transmission method for a UL data channel (e.g., PUSCH), the 5G wireless communication system may support two types: grant-free PUSCH transmission type 1 (or type-1 PUSCH transmission with a configured grant) and grant-free PUSCH transmission type 2 (or type-2 PUSCH transmission with a configured grant).

[Grant-Free PUSCH Transmission Type 1]

In the grant-free PUSCH transmission type 1, the BS may configure the UE with specific time/frequency resources 600 that allow grant-free PUSCH transmission via higher layer signaling, e.g., RRC signaling. In detail, pieces of configuration information may be listed in Table below.

TABLE 18

| |
|---|
| ConfiguredGrantConfig ::=   SEQUENCE { |
|   frequencyHopping (Frequency hopping)   ENUMERATED {mode1,mode2}   OPTIONAL, -- Need S, |
|   cg-DMRS-Configuration (DMRS configuration)   DMRS-UplinkConfig, |
|   mcs-Table   ENUMERATED {qam256, spare1}   OPTIONAL, -- Need S |
|   mcs-TableTransformPrecoder (MCS table)   ENUMERATED {qam256, spare1}   OPTIONAL, -- Need S |
|   uci-OnPUSCH (Support of UCI on PUSCH)   SetupRelease { CG-UCI-OnPUSCH }, |
|   resourceAllocation   (Resource allocation type)   ENUMERATED { resourceAllocationType0, resourceAllocationType1, dynamicSwitch }, |
|   rbg-Size (RBG size)   ENUMERATED {config2}   OPTIONAL, -- Need S |
|   powerControlLoopToUse(closed loop power control)   ENUMERATED {n0, n1}, |
|   p0-PUSCH-Alpha (Power control parameters)   P0-PUSCH-AlphaSetId, |
|   transformPrecoder (Enable/disable transform precoding)   ENUMERATED {enabled}   OPTIONAL, -- Need S |
|   nrofHARQ-Processes (HARQ process number)   INTEGER}1.16), |
|   repK (Number of repetitions)   ENUMERATED {n1, n2, n4, n8}, |
|   repK-RV (Redundancy version)   ENUMERATED {s1-0231, s2-0303, s3-0000}   OPTIONAL, -- CondRepK |
|   periodicity   ENUMERATED { sym2, sym7, sym1x14, sym2x14, sym4x14, sym5x14, sym8x14, sym10x14, sym16x14, sym20x14, sym32x14, sym40x14, sym64x14, sym80x14, sym128x14, sym160x14, sym256x14, sym320x14, sym512x14, sym640x14, sym1024x14, sym1280x14, sym2560x14, sym5120x14, sym6, sym1x12, sym2x12, sym4x12, sym5x12, sym8x12, sym10x12, sym16x12, sym20x12, sym32x12, sym40x12, sym64x12, sym80x12, sym128x12, sym160x12, sym256x12, sym320x12, sym512x12, sym640x12, sym1280x12, sym2560x12 }, |
|   configuredGrantTimer (Configured grant timer)   INTEGER (1..64)   OPTIONAL, -- Need R |
|   rrc-ConfiguredUplinkGrant   SEQUENCE { |
|     timeDomainOffset(Time doman offset)   INTEGER (0..5119), |
|     timeDomainAllocation (Time domain allocation)   INTEGER (0..15), |
|     frequencyDomainAllocation(Frequency domain allocation)   BIT STRING (SIZE(18)), |
|     antennaPort(Antenna ports)   INTEGER (0..31), |

TABLE 18-continued

| | |
|---|---|
| dmrs-SeqInitialization(DMRS sequence initialization) (0..1) | INTEGER OPTIONAL, -- Cond NoTransformPrecoder |
| precodingAndNumberOfLayers(Precoding and number of layers) INTEGER (0..63), | |
| srs-ResourceIndicator(SRS resource indicator) | INTEGER (0..15), |
| mcsAndTBS(MCS and TBS) | INTEGER (0..31), |
| frequencyHoppingOffset(Frequency hopping offset) INTEGER (1.. maxNrofPhysicalResourceBlocks-1) - Need M | OPTIONAL, - |
| pathlossReferenceIndex(Path-loss reference index) (0..maxNrofPUSCH-PathlossReferenceRSs-1), ... } | INTEGER |
| OPTIONAL -- Need R } | |

When receiving configuration information for the grant-free PUSCH transmission type 1 from the BS, the UE may transmit a PUSCH using the periodically configured resources 600 without a grant from the BS. Various parameters required to transmit the PUSCH (e.g., frequency hopping, DMRS configuration, a MCS, a RBG size, the number of repetitions, a RV, precoding and the number of layers, antenna ports, a frequency hopping offset, etc.) may be set according to configuration values notified by the BS.

[Grant-Free PUSCH Transmission Type-2]

In the grant-free PUSCH transmission type 2, the BS may configure the UE with some (e.g., periodicity information 603, etc.) of information about the specific time/frequency resources 600 that allow grant-free PUSCH transmission via higher layer signaling, e.g., RRC signaling. Furthermore, the BS may configure the UE with various parameters for PUSCH transmission (e.g., frequency hopping, DMRS configuration, a MCS table, a RBG size, the number of repetitions, a RV, etc.) via higher layer signaling. In detail, the BS may configure the UE with configuration information as listed in Table below via higher layer signaling.

TABLE 19

| |
|---|
| ConfiguredGrantConfig ::=    SEQUENCE { |
| frequency Hopping (Frequency hopping)    ENUMERATED {mode1 mode2}    OPTIONAL, -- NeedS, |
| cg-DMRS-Configuration (DMRS configuration)    DMRS-UplinkConfig, |
| mcs-Table    ENUMERATED    {qam256, spare 1}    OPTIONAL, -- NeedS |
| mcs-TableTransformPrecoder (MCS table)    ENUMERATED    {qam256, spare1}    OPTIONAL, --NeedS |
| uci-OnPUSCH (Support of UCI on PUSCH) SetupRelease { CG-UCI-OnPUSCH }, |
| resourceAllocation    (Resource allocation type) ENUMERATED    { resourceAllocationType0, resourceAllocationType1, dynamicSwitch }, |
| rbg-Size (RBG size)    ENUMERATED {config2}    OPTIONAL, -- Need S |
| powerControlLoopToUse(closed loop power control)    ENUMERATED { n0, n1 }, |
| p0-PUSCH-Alpha (Power control parameter)    P0-PUSCH-AlphaSetId, |
| transformPrecoder (Enable/disable transform precoding) ENUMERATED {enabled}    OPTIONAL, -- Need S |
| nrofHARQ-Processes (HARQ process number)    INTEGER(1..16), |
| repK (Number of repetitions)    ENUMERATED {n1, n2, n4, n8}, |
| repK-RV (Redundancy version)    ENUMERATED {s1-0231, s2-0303, s3-0000}    OPTIONAL,    -- CondRepK |
| periodicity    ENUMERATED { sym2, sym7, sym1x14, sym2x14, sym4x14, sym5x14, sym8x14, sym10x14, sym16x14, sym20x14, sym32x14, sym40x14, sym64x14, sym80x14, sym128x14, sym160x14, sym256x14, sym320x14, sym512x14, sym640x14,    sym1024x14, sym1280x14, sym2560x14, sym5120x14, sym6, sym1x12, sym2x12, sym4x12, sym5x12, sym8x12, sym10x12, syml6x12, sym20x12, sym32x12, sym40x12, sym64x12, sym80x12, sym128x12, syml60x12, sym256x12, sym320x12, sym512x12, sym640x12, sym1280x12, sym2560x12 }, |
| configuredGrantTimer (Configured grant timer)    INTEGER (1..64)    OPTIONAL,    -- Need R } |

In addition to the above-described configuration information, scheduling information related to the PUSCH (e.g., information corresponding to all or part of the scheduling information in a DCI format that can be used for scheduling the PUSCH (see Tables 6 and 7)) may be transmitted to the UE via DCI (DCI transmitted for activating a UL grant Type 2).

The BS may transmit DCI including specific DCI field values to the UE for the purpose of scheduling activation or scheduling release for DL SPS and UL grant Type 2.

In detail, the BS may configure the UE with a CS-RNTI, and the UE may monitor a DCI format scrambled by the CS-RNTI. In a case that the CRC of the DCI format received by the UE is scrambled by the CS-RNTI, a new data indicator (NDI) is set to '0', and a DCI field satisfies the Table below, the UE may consider the DCI as a trigger for activating DL SPS or UL grant type 2 transmission and reception.

TABLE 20

|  | DCI format 0_0/0_1 | DCI format 1_0 | DCI format 1_1 |
| --- | --- | --- | --- |
| HARQ process number | set to all '0's | set to all '0's | set to all '0's |
| Redundancy version | set to '00' | set to '00' | For the enabled transport block: set to '00' |

The BS may configure the UE with a CS-RNTI, and the UE may monitor a DCI format scrambled by the CS-RNTI. In a case that the CRC of the DCI format received by the UE is scrambled by the CS-RNTI, a NDI is set to '0', and DCI fields satisfy the Table below, the UE may consider the DCI as a trigger for releasing DL SPS or UL grant type 2 transmission and reception.

TABLE 21

|  | DCI format 0_0 | DCI format 1_0 |
| --- | --- | --- |
| HARQ process number | set to all '0's | set to all '0's |
| Redundancy version | set to '00' | set to '00' |
| Modulation and coding scheme | set to all '1's | set to all '1's |
| Frequency domain resource assignment | set to all '1's | set to all '1's |

Because a DCI indicating release of DL SPS or UL grant Type 2 conforms to a DCI format corresponding to DCI format 0_0 or DCI format 1_0, and the DCI format 0_0 or 1_0 does not include a carrier indicator field (CIF), to receive a release command for a DL SPS or UL grant Type 2 for a specific cell, the UE always has to monitor a PDCCH on the cell in which the corresponding DL SPS or UL grant Type 2 is configured. Even when the specific cell is configured for cross-carrier scheduling, the UE always has to monitor DCI format 1_0 or DCI format 0_0 on the corresponding cell in order to receive a release command for the DL SPS or UL grant Type 2 configured in the cell.

Hereinafter, embodiments of the present disclosure are described in detail with reference to the accompanying drawings. Although embodiments of the present disclosure will be described using a 5G wireless communication system as an example, the embodiments of the present disclosure may be applied to other communication systems having similar technical backgrounds and channel configurations. A communication system developed after LTE and LTE-A or 5G may be included in the other communication systems. It should be also understood by those skilled in the art that embodiments of the present disclosure are applicable to the other communication systems through modifications not departing from the scope of the present disclosure.

Furthermore, in the following description of the embodiments of the present disclosure, related functions or configurations are not described in detail because they would obscure the essence of the present disclosure with unnecessary detail. In addition, the terms to be described later are defined by taking functions described in the present disclosure into account and may be changed according to a user's or operator's intent or customs. Therefore, definition of the terms should be made based on the overall descriptions in the present specification.

Hereinafter, in describing the present disclosure, higher layer signaling may be signaling corresponding to at least one or a combination of one or more of the following signaling methods:

MIB
System Information Block (SIB) or SIB X (X=1, 2, . . . )
RRC
Medium Access Control (MAC) Control Element)
UE capability signaling In addition, L1 signaling may be signaling corresponding to at least one or a combination of one or more of the following physical layer channels or signaling methods using signaling.

PDCCH
DCI
UE-specific DCI
Group common DCI
Common DCI
Scheduling DCI (e.g., DCI used for scheduling DL or UL data)
Non-scheduling DCI (e.g., DCI not used for scheduling DL or UL data)
PUCCH
UL control information (UCI)

Embodiment 1

In embodiment 1 of the present disclosure, a grant-free PDSCH transmission and reception method (which may be alternatively referred to as a DL SPS transmission and reception method, a SPS PDSCH transmission and reception method, a configured scheduling PDSCH transmission and reception method, a configured grant PDSCH transmission and reception method, etc.) is described.

The BS may configure the UE with various parameters for DL SPS to the UE via higher layer signaling and/or L1 signaling. For example, the BS may configure the UE with parameters corresponding to the Table 17 above via higher layer signaling and/or L1 signaling. In addition, the BS may transmit DCI for activating the DL SPS to the UE. The BS may configure the UE with various pieces of scheduling information for DL SPS PDSCH transmission via DCI that activates DL SPS (For details about the DCI that activates the DL SPS, see the above description of the grant-free transmission and reception method in the 5G wireless communication system). The BS may transmit a PDSCH based on DL SPS scheduling information configured for the UE. The BS may or may not transmit the PDSCH using resources configured based on the DL SPS.

The UE may be configured by the BS with various parameters for DL SPS through higher layer signaling and/or L1 signaling. For example, the UE may be configured by the BS with parameters corresponding to the Table 17 above via higher layer signaling and/or L1 signaling, and obtain various pieces of scheduling information related to PDSCH reception via DCI transmitted for activating the DL SPS. Upon receiving the DCI indicating activation of the DL SPS, the UE may perform reception and decoding for the PDSCH based on the configured scheduling information for the DL SPS after a specific time point.

Depending on whether the UE successfully decodes the PDSCH transmitted based on the DL SPS, the UE may feed back a hybrid automatic repeat request acknowledgement (HARQ-ACK) to the BS. If the UE successfully decodes the PDSCH, the UE may feed back an ACK to the BS as HARQ-ACK information, and the if the UE fails to decode the PDSCH, the UE may feed back a negative ACK (NACK) to the BS as HARQ-ACK information. A HARQ-ACK information bit value of '0' may represent a NACK, and a HARQ-ACK information bit value of '1' may represent an ACK.

The BS may determine whether to retransmit the PDSCH based on the HARQ-ACK information received from the UE. For any PDSCH transmitted by the BS to the UE, if the BS receives a NACK from the UE, the BS may perform retransmission of the corresponding PDSCH, and if the BS receives an ACK from the UE, the BS may not perform retransmission of the PDSCH.

As described above, the BS operating based on the DL SPS may or may not transmit the PDSCH in a resource region configured based on DL SPS scheduling information, and the UE may attempt to periodically monitor or decode the resource region where the PDSCH can be transmitted based on the DL SPS scheduling information. Therefore, even when the BS does not transmit the PDSCH, the UE may unnecessarily perform a decoding operation on the PDSCH because the UE does not have prior information about it, and additionally transmit a NACK as HARQ-ACK as PDSCH detection fails. Accordingly, power consumption waste may occur due to the unnecessary decoding operation for the PDSCH and the operation of transmitting the HARQ-ACK and thus cause inefficient power usage.

Hereinafter, more efficient DL SPS-based PDSCH transmission and reception operations performed by the BS and the UE are described in detail by describing various embodiments.

Embodiment 1-1

In the embodiment 1-1 of the present disclosure, for minimizing a UE's unnecessary decoding operation on a DL SPS-based PDSCH, a data indication signal (DIS) indicating whether the PDSCH is actually transmitted may be additionally considered. In detail, the BS may transmit, to the UE, a DIS indicating whether the PDSCH is actually transmitted in an activated DL SPS transmission resource region, and the UE may determine, based on the indication by the DIS received from the BS, whether to perform monitoring and/or decoding of the PDSCH in subsequent DL SPS transmission resources. If the DIS indicates that the UE shall perform monitoring and/or decoding of the PDSCH in DL SPS transmission resources (or the BS notifies that the PDSCH has been transmitted in the DL SPS transmission resources), the UE may perform monitoring and/or decoding of the PDSCH in the DL SPS resources. In detail, if the UE performs monitoring on the PDSCH in DL SPS resources and detect the PDSCH, the UE may perform decoding of the detected PDSCH. If the DIS indicates that the UE shall not perform monitoring and/or decoding of the PDSCH in the DL SPS transmission resources (or the BS notifies that the PDSCH will not be transmitted in the DL SPS transmission resources), the UE may not perform monitoring and/or decoding of the PDSCH in the DL SPS resources.

The DIS may be referred to as a data indicator, a PDSCH monitoring indicator, a PDSCH monitoring activation indicator, a wake-up signal for PDSCH (WUS-PDSCH), a WUS for DL SPS (WUS-SPS), a power saving signal for PDSCH, a power saving signal for DL SPS, etc. A power saving signal may be expressed by various names such as a power control signal and a power configuration signal.

DL SPS transmission and reception operations will be described in more detail below with reference to the drawings.

Figure 7:
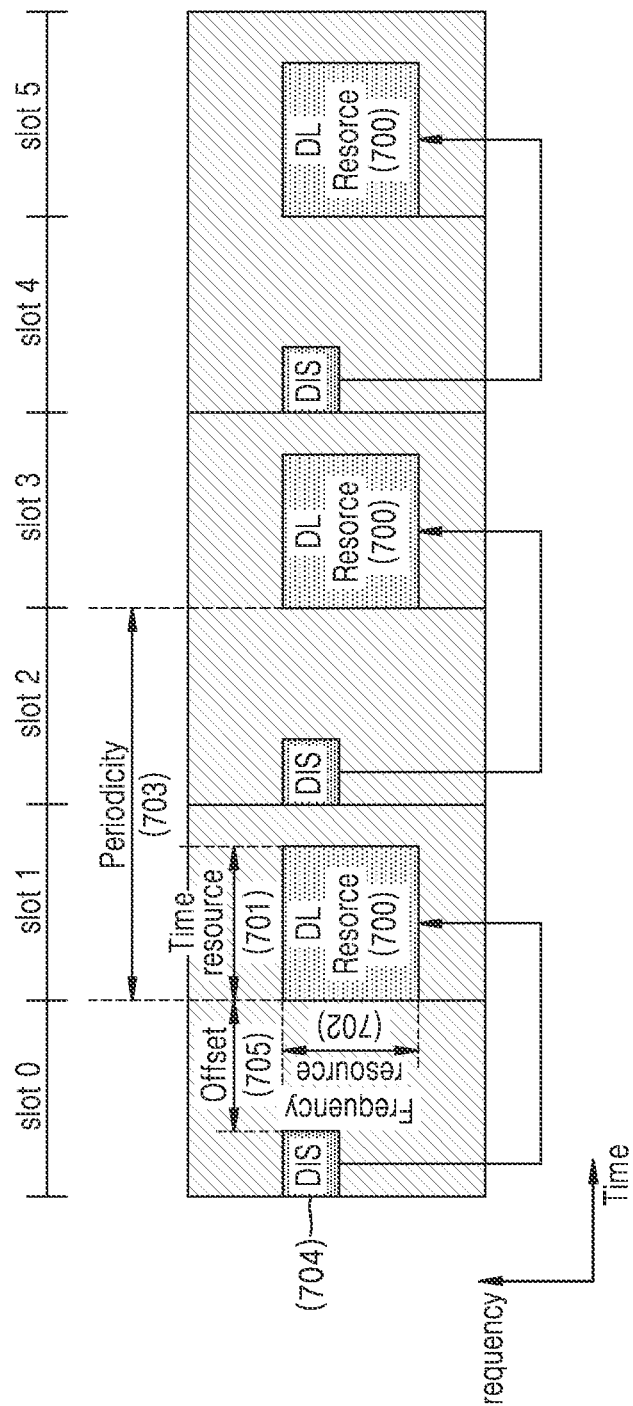
FIG. 7 illustrates an example of downlink Semi-Persistent Scheduling (SPS) transmission and reception operations according to an embodiment of the present disclosure.

FIG. 7 illustrates an example of DL SPS transmission and reception operations according to an embodiment of the present disclosure.

As described above, the BS may configure the UE with various pieces of scheduling information including a DL SPS transmission resource region (which may include a time resource region 701, a frequency resource region 702, and a periodicity 703) via higher layer signaling and/or L1 signaling. The BS may additionally configure various parameters used by the UE to monitor a DIS 704 via higher layer signaling and/or L1 signaling. For example, the parameters may include the following pieces of information.

[DIS Related Configuration Information]

A DIS transmission resource (time resource, frequency resource, periodicity, monitoring occasion, etc.)

An offset (e.g., an offset 705) between a DIS transmission resource and a resource region configured based on DL SPS The UE may inform a BS of a possible offset value or a preferred offset value in the form of capability signaling or UE assisted information via higher layer signaling.

The BS may determine an offset value to be actually configured, based on the possible offset value or the preferred offset value received from the UE.

Association between a DIS and a DL SPS resource

For example, there may be mapping of one DIS to one DL SPS resource (one-to-one mapping), mapping of one DIS to a plurality of DL SPS resources (one-to-many mapping), or the like. Any DIS resource may be associated with any DL SPS resource, and the DIS may indicate whether to transmit a PDSCH on the associated DL SPS resource. The association between DIS and DL SPS may be explicitly configured or implicitly determined.

Information related to a method of transmitting a DIS (e.g., information related to transmission and a structure of a physical layer channel on which the DIS is transmitted)

In an embodiment of the present disclosure, the DIS may be transmitted in the form of a sequence. The parameters may include related parameter information for determining a DIS sequence, e.g., sequence identity (ID), an ID required to create a sequence, etc.

In an embodiment of the present disclosure, the DIS may be transmitted in the form of a reference signal (RS). A RS may include a tracking RS (TRS), channel state information RS (CSI-RS), etc.

In an embodiment of the present disclosure, the DIS may be transmitted via a PDCCH. A DCI format including the DIS may be defined, and the DCI format may be transmitted via the PDCCH.

The UE may receive configuration information related to the DIS 704 from the BS and perform monitoring on the DIS based on the configuration information. The UE may receive an indicator or DCI format for activating specific DL SPS resources from the BS, and activate the corresponding DL SPS resources according to the content thereof. The UE may start monitoring the DIS from a time point after receiving the indicator for activating the DL SPS resources (e.g., after receiving the DCI format for activating DL SPS or after X slots). Information about the time point when the UE starts monitoring the DIS after receiving the DCI format for activating the DL SPS may be predefined, configured by the BS for the UE via higher layer signaling and/or L1 signaling, or determined by capability signaled by the UE to the BS. The UE may control a DL SPS PDSCH reception operation based on control information transmitted in the DIS. For example, the DIS may include the following control information.

[Control Information Transmitted in DIS]
  Control information #1: a PDSCH monitoring indicator (or a PDSCH scheduling indicator)
    An indicator indicating whether to perform a decoding operation on a PDSCH for a resource 700 configured based on specific DL SPS.
  Control information #2: A length of a time period in which the content of control Information #1 is to be applied
    An indicator indicating the length of the time period in which the UE will operate according to the content of the control information #1
  Control information #3: Information related to retransmission
    NDI
    HARQ process number
    PUCCH resource information for a HARQ-ACK feedback In an embodiment of the present disclosure, the DIS may indicate whether to transmit a PDSCH in one or more DL SPS resources or a DL SPS resource group. The DL SPS resource group may consist of one or a plurality of DL SPS resources, and information about the DL SPS group may be configured by the BS for the UE via higher layer signaling.

In an embodiment of the present disclosure, all or some of the pieces of control information that can be transmitted in the DIS may be determined explicitly or implicitly. For example, a separate explicit field for the control information #1 may be present, or the control information may be implicitly determined based on whether the DIS is detected. As an example of an implicit determination method, if the DIS is detected, the UE may determine to perform monitoring on a DL SPS-based PDSCH, and if the DIS is not detected, the UE may not perform monitoring on the DL SPS-based PDSCH.

In an embodiment of the present disclosure, the BS may always transmit the DIS at a time point when the DIS configured for the UE can be transmitted, or transmit it only when a specific condition is satisfied. For example, the DIS may always be transmitted and explicitly indicate whether the UE is to monitor the DL SPS-based PDSCH. As another example, the DIS may be transmitted when the PDSCH transmitted using DL SPS resources exists while the DIS may not be transmitted when the PDSCH transmitted using the DL SPS resources does not exist.

In an embodiment of the present disclosure, the UE may perform at least one of the following operations as a default operation or a fallback operation when the DIS is not detected.

Operation #1: Monitoring of a PDSCH in DL SPS resources may be performed.
  Operation #2: Monitoring of the PDSCH in the DL SPS resources may not be performed.
  Operation #3: Whether to perform monitoring on the PDSCH in the DL SPS resources may be configured by the BS. If there is no configuration for the fallback operation, one of the operations #1 and #2 may be performed.

Figure 8:
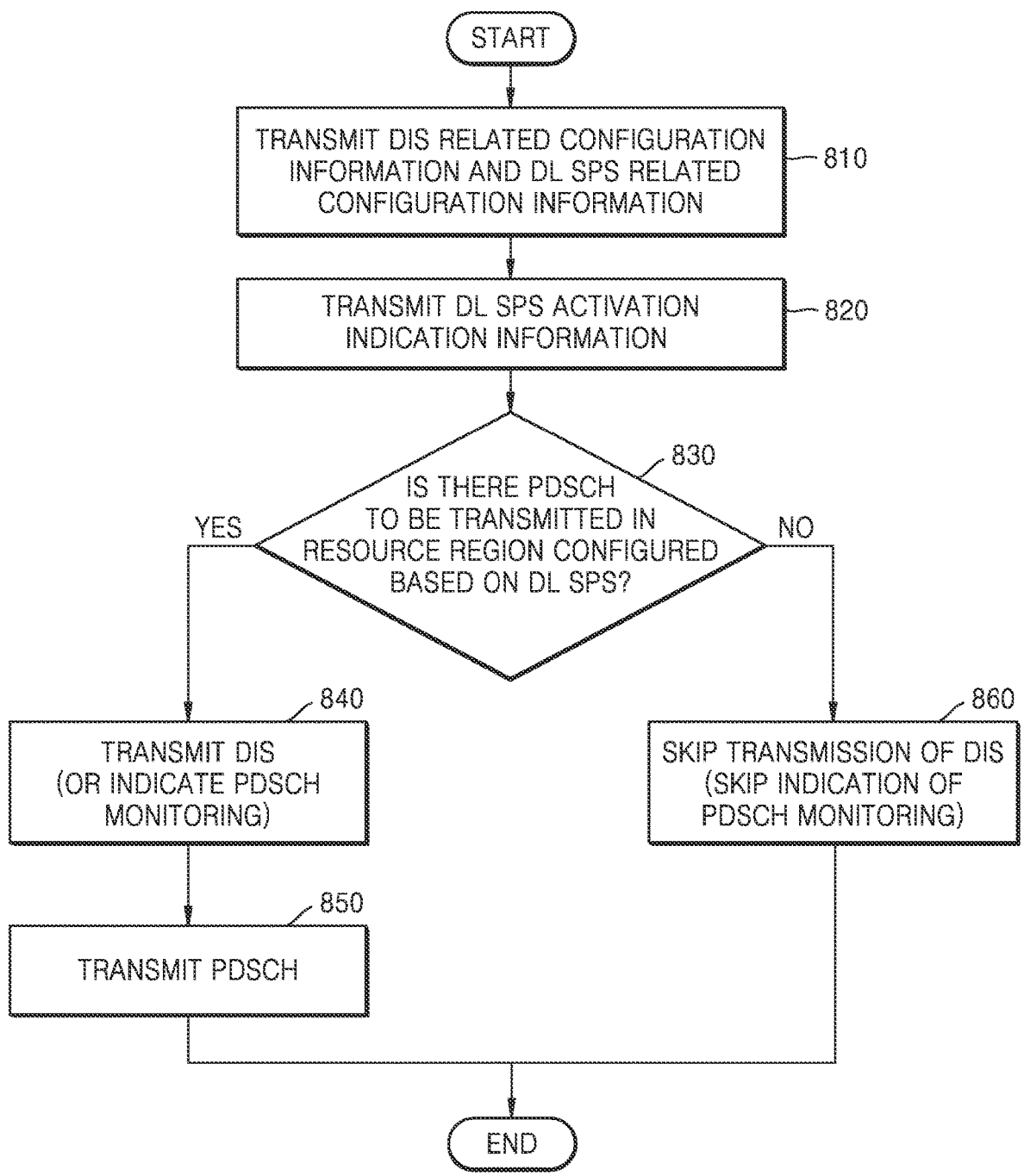
FIG. 8 illustrates an operation of a base station according to an embodiment of the present disclosure.

FIG. 8 illustrates an operation of a BS according to an embodiment of the present disclosure.

In operation 810, a BS may transmit DL SPS related configuration information and DIS related configuration information to a UE via higher layer signaling and/or L1 signaling. In this case, the DL SPS related configuration information and the DIS related configuration information may be transmitted together as one piece of information or may be transmitted separately. When the DL SPS related configuration information and the DIS related configuration information are transmitted separately, one of the DL SPS related configuration information and the DIS related configuration information may be transmitted first while the other may be transmitted later, or they may be transmitted simultaneously. In an embodiment, the DIS related configuration information may include a transmission resource for a DIS, an offset between the DIS and a resource region configured by DL SPS configuration information, association between the DIS and a transmission resource for a DL data channel, information related to a method of transmitting the DIS, etc.

In operation 820, the BS may transmit DL SPS activation indication information to the UE. In an embodiment, the BS may transmit an indicator or DCI format indicating activation of the configured DL SPS as the DL SPS activation indication information. The DCI format may include information corresponding to all or some of pieces of scheduling information (See Tables 8 and 9). In an embodiment, when the BS transmits the DL SPS activation indication information to the UE, the BS may stop transmission of a DL control channel for transmitting a DL data channel. Furthermore, when the UE receives DL SPS release indication information from the BS, when decoding for a DL data channel fails, when the UE transmits a NACK feedback to the BS as HARQ-ACK information, when the UE receives information indicating the start of monitoring of a DL control channel, or when a timer expires, the UE may start monitoring the DL control channel for receiving the DL data channel.

In operation 830, the BS may determine whether there is a DL data channel to be transmitted based on the DL SPS related configuration information. In an embodiment, the BS may determine whether a PDSCH to be transmitted in a resource configured based on DL SPS exists at a specific time point. If the BS determines that there is a PDSCH to be transmitted in the resource configured based on the DL SPS, the BS may perform operation 840 so as to transmit a DIS to the UE based on the DIS related configuration information. In an embodiment, the BS may transmit a DIS based on the DIS related configuration information configured for the UE, or transmit an indicator indicating monitoring of the PDSCH as control information transmitted in the DIS. In an embodiment, the DIS may include monitoring indication information for a DL data channel, information about a time period during which monitoring of the DL data channel is to be performed, information related to retransmission, etc. Subsequently, in operation 850, the BS may transmit the DL data channel to the UE. In other words, the PDSCH may be transmitted in the DL SPS resources. If the BS determines that there is no PDSCH to be transmitted using the resources configured based on the DL SPS in operation 830, the BS may perform operation 860 so that it may not transmit the DIS or may transmit an indicator indicating that monitoring of the PDSCH is not to be performed as control information transmitted in the DIS.

Figure 9:
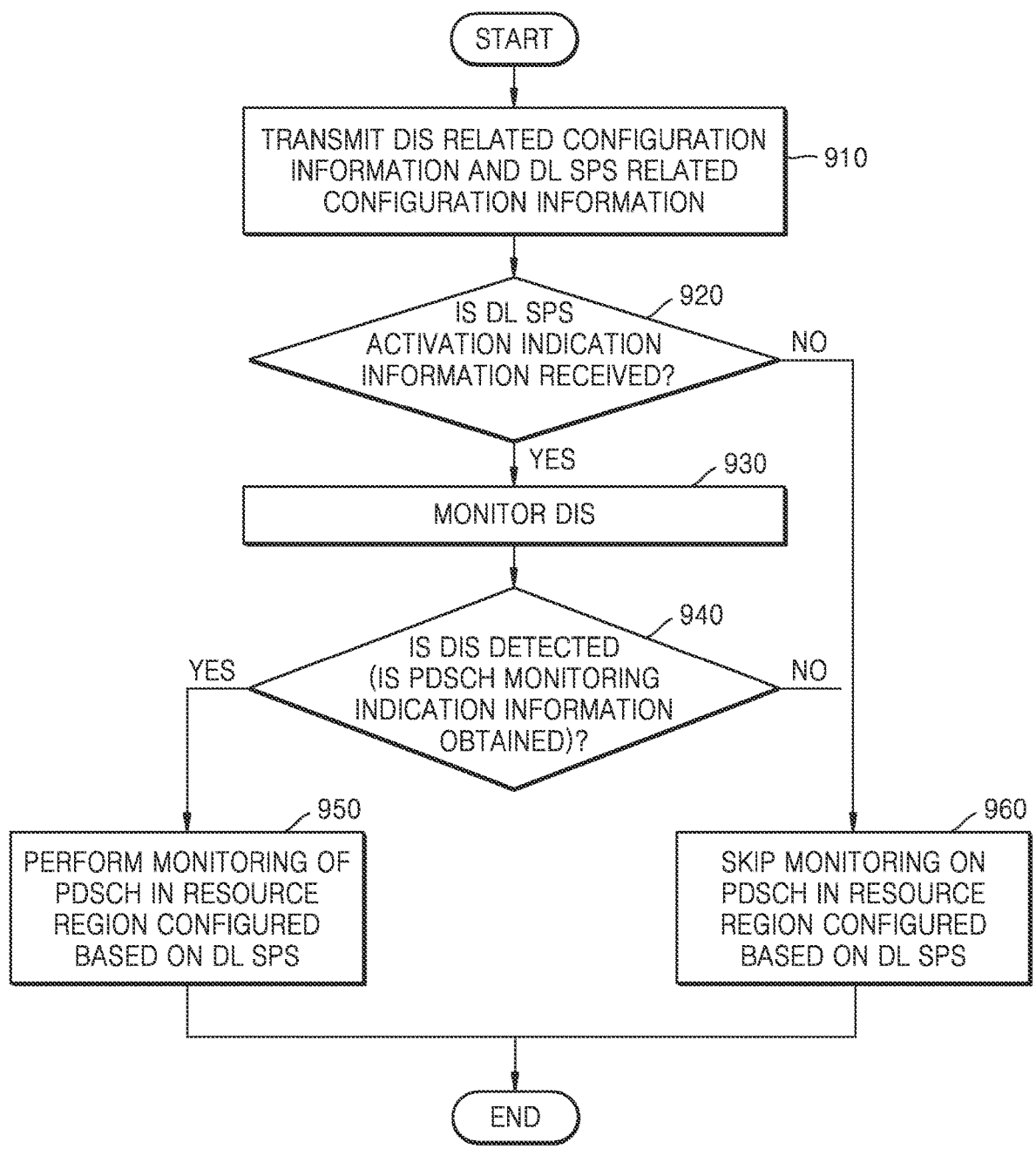
FIG. 9 illustrates an operation of a terminal according to an embodiment of the present disclosure.

FIG. 9 illustrates an operation of a UE according to some embodiments of the present disclosure.

In operation 910, the UE may receive DL SPS related configuration information and DIS related configuration information from the BS via higher layer signaling and/or L1 signaling. In this case, the DL SPS related configuration information and the DIS related configuration information may be received together as one piece of information or may be received separately. When the DL SPS related configuration information and the DIS related configuration information are received separately, one of the DL SPS related configuration information and the DIS related configuration information may be received first while the other may be received later, or they may be received simultaneously. In an embodiment, the DIS related configuration information may include a transmission resource for a DIS, an offset between the DIS and a resource region configured by DL SPS configuration information, association between the DIS and a transmission resource for a DL data channel, information related to a method of transmitting the DIS, etc.

In operation 920, the UE may determine whether DL SPS activation indication information is received from the BS. In an embodiment, the UE may receive an indicator or DCI format indicating activation of the configured DL SPS as the DL SPS activation indication information. The DCI format may include information corresponding to all or some of pieces of scheduling information (See Tables 8 and 9).

When the UE receives the DL SPS activation indication information in operation 920, the UE may perform operation 930 and monitor a DIS based on the DIS related configuration information. In an embodiment, the DIS may include monitoring indication information for a DL data channel, information about a time period during which monitoring of the DL data channel is to be performed, information related to retransmission, etc. In an embodiment, when the UE receives the DL SPS activation indication information, the UE may stop monitoring of a DL control channel for receiving a DL data channel. Furthermore, when the UE receives DL SPS release indication information from the BS, when decoding for a DL data channel fails, when the UE transmits a NACK feedback to the BS as HARQ-ACK information, when the UE receives information indicating the start of monitoring of a DL control channel, or when a timer expires, the UE may start monitoring the DL control channel for receiving the DL data channel.

In operation 940, the UE may determine whether the DIS is detected or whether monitoring indication information for a DL data channel, i.e., a DL SPS-based PDSCH, is obtained from the detected DIS.

When the UE detects the DIS or obtains the monitoring indication information for the PDSCH in operation 940, the UE may monitor the DL data channel based on at least one of the DL SPS related configuration information and the DL SPS activation indication information in operation 950. In detail, the UE may perform monitoring of the PDSCH in a resource region configured based on DL SPS. When the UE fails to detect a DIS or obtain the monitoring indication information for the PDSCH in operation 940 or when the UE does not receive the DL SPS activation indication information in operation 920, the UE may not perform monitoring on the PDSCH in the resource region configured based on DL SPS in operation 960. In other words, the UE may skip the monitoring.

Embodiment 1-2

The embodiment 1-2 of the present disclosure proposes a method of controlling monitoring of a PDCCH in order to prevent additional power consumption of a UE operating based on the DL SPS. The UE operating by activating the DL SPS may not perform PDCCH monitoring for the entire or a part of a search space set, or may selectively perform PDCCH monitoring when a specific condition is satisfied.

DL SPS transmission and reception operations will be described in more detail below with reference to the drawings.

Figure 10:
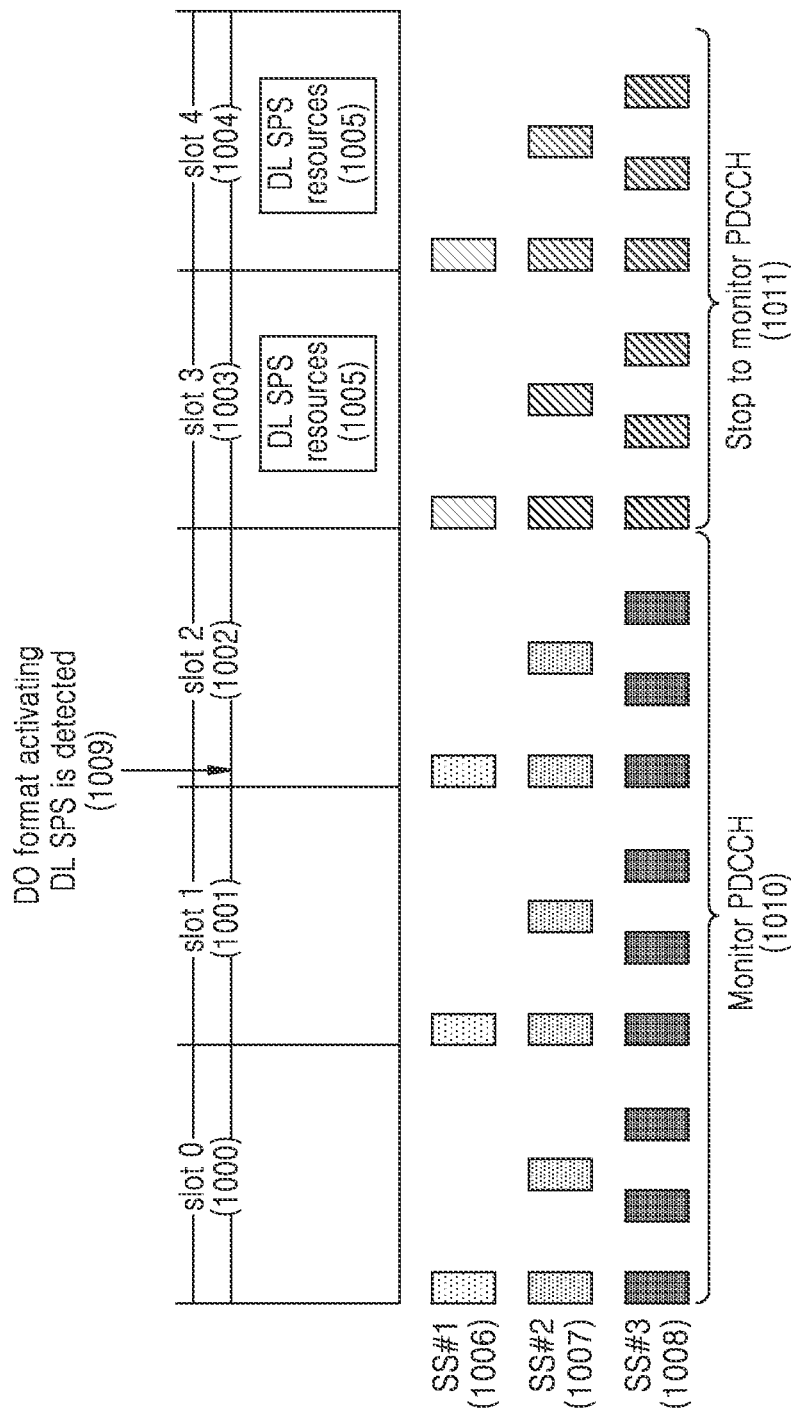
FIG. 10 illustrates an example of downlink SPS transmission and reception operations according to another embodiment of the present disclosure.

FIG. 10 illustrates an example of DL SPS transmission and reception operations according to another embodiment of the present disclosure.

The BS may configure the UE with DL SPS (1005) and transmit an indicator or DCI format that activates the DL SPS. If the UE obtains the DL SPS activation indicator or DCI format (1009), the UE may perform monitoring on a PDSCH in corresponding DL SPS resources 1005. In the embodiment 1-2 of the present disclosure, it is possible to additionally control a UE's monitoring operation for the PDCCH based on whether the DL SPS is activated. In the embodiment shown in FIG. 10, the UE that has been configured by the BS with a plurality of search spaces (SSs) SS #1 1006, SS #2 1007, and SS #3 1008) may monitor a PDCCH on which a DCI format may be transmitted in the configured SSs (1010). The UE that has received the DCI format for activating the DL SPS at a specific time point (in slot 2 1002 in FIG. 10) may not perform PDCCH monitoring in the configured SSs 1006, 1007, and 1008 from a time point (slot 3 1003) that occurs after receiving the DCI format (1011). In an embodiment, when the BS transmits DL SPS activation indication information to the UE, the BS may stop transmission of a DL control channel for transmitting a DL data channel, and the UE may stop monitoring the DL control channel for receiving the DL data channel. In other words, the UE does not expect DCI-based PDSCH transmission and reception from a time point when DL SPS is activated, but may expect PDSCH transmission and reception based on DL SPS from the time point. By minimizing unnecessary PDCCH monitoring, power consumption of the UE may be significantly reduced.

In an embodiment of the present disclosure, after obtaining the indicator for activating the DL SPS, the UE may stop PDCCH monitoring for all preconfigured SS sets. Alternatively, the UE may stop PDCCH monitoring for some SSs (hereinafter called a "first SS") among the preconfigured SS sets while continuously performing PDCCH monitoring for other SSs (hereinafter called a "second SS"). The first SS and the second SS may be explicitly configured by the BS for the UE via higher layer signaling or implicitly determined as SSs that satisfy a specific condition. For example, SSs having the following characteristics may correspond to the "first SS".

[First SS]
  A SS having a SS type configured as a UE-specific SS
  A SS receiving a DCI format for activating DL SPS
  A SS not configured for the purpose of a retransmission operation for a DL SPS-based PDSCH For example, SSs having the following characteristics may correspond to the "second SS".

[Second SS]
- A SS having a SS type configured as a common SS
- A SS configured to monitor a DCI format scrambled with SFI-RNTI (a DCI format corresponding to a SFI) among SSs having a SS type configured as a common SS
- A SS configured to monitor a DCI format scrambled with preemption indication (PI)-RNTI (a DCI format corresponding to PI) among the SSs having a SS type configured as a common SS
- A SS configured for the purpose of a retransmission operation for a DL SPS-based PDSCH In an embodiment of the present disclosure, the UE may not perform PDCCH monitoring in all or some of the SSs from a specific time point after obtaining the indicator for activating the DL SPS. Information about the time point when the UE stops PDCCH monitoring after obtaining the indicator for activating the DL SPS may be predefined as a fixed value, configured via higher layer signaling from the BS, or determined by capability signaled by the UE to the BS.

In an embodiment of the present disclosure, the UE may not perform PDCCH monitoring in all or some of the SSs from a specific time point after obtaining the indicator for activating the DL SPS, and may resume the PDCCH monitoring if a specific condition is satisfied. The specific condition may correspond to, for example, a condition corresponding to at least one or a combination of one or more of the following conditions.

[Conditions for Resuming PDCCH Monitoring]
- Condition #1: When the UE receives an indicator or DCI format indicating release for DL SPS
- Condition #2: When the UE fails to decode a DL SPS-based PDSCH
- Condition #3: When the UE fails to decode the DL SPS-based PDSCH and transmits a NACK to the BS as HARQ-ACK information.
- Condition #4: When the UE explicitly receives an indicator or configuration information corresponding to resumption of PDCCH monitoring from the BS
- Condition #5: When a timer expires
  - For example, the UE may be configured by the BS with a timer for resuming PDSCCH monitoring and resume PDCCH monitoring when the timer expires.
  - As another example, the UE may be configured by the BS with a timer for releasing the DL SPS, and resume PDCCH monitoring when the timer expires because a DL SPS-based PDSCH is not detected for a specific time period.
  - Various other types of timers may be used.

In other words, in an embodiment, when the BS transmits DL SPS release indication information to the UE, when the UE fails to decode a DL data channel, when the UE transmits a NACK feedback to the BS as HARQ-ACK information, when the UE receives information indicating the start of monitoring of a DL control channel, or when a timer expires, the BS may transmit the DL control channel for transmitting the DL data channel, and the UE may start monitoring the DL control channel for receiving the DL data channel.

Figure 11:
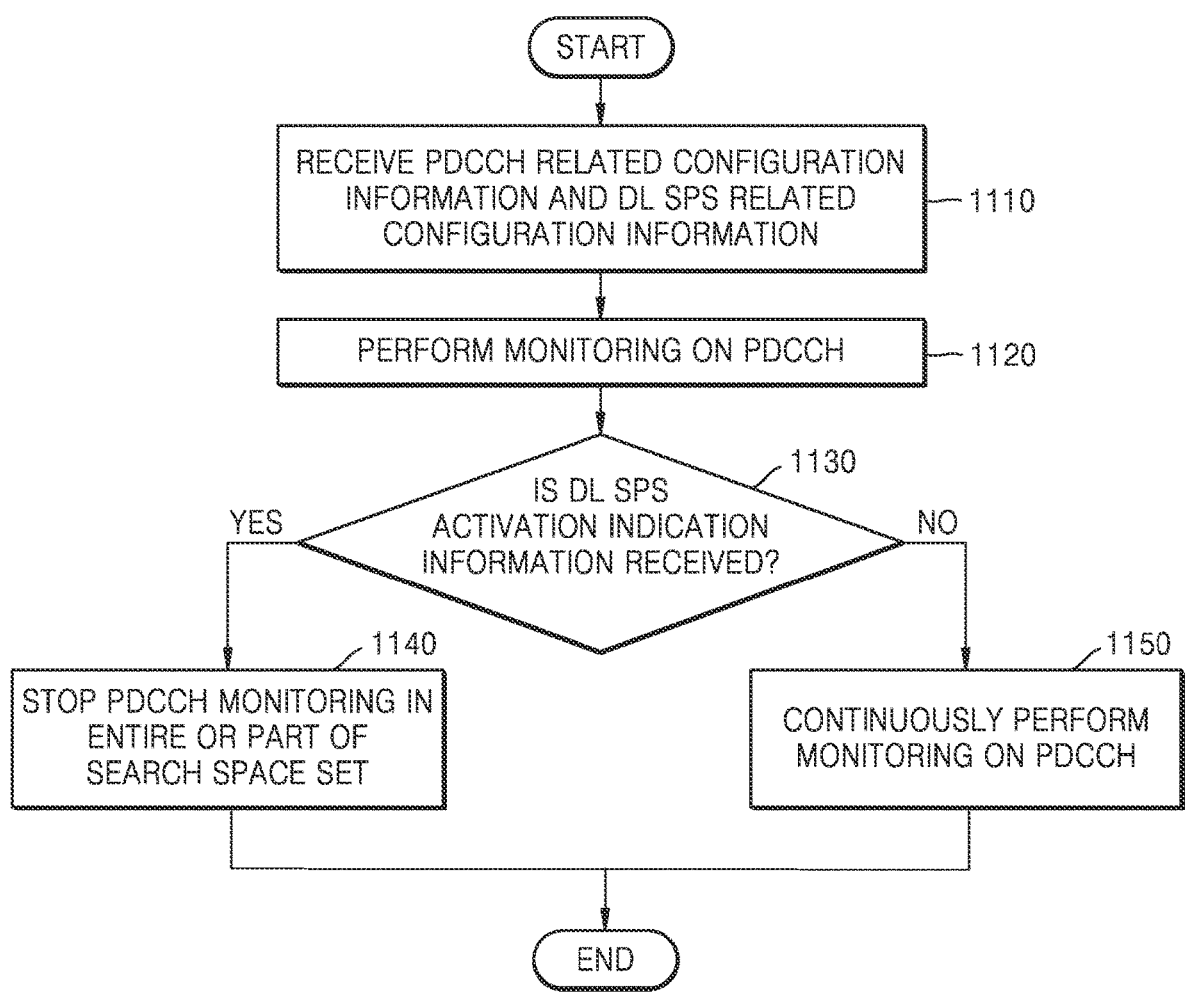
FIG. 11 illustrates an operation of a terminal according to another embodiment of the present disclosure.

FIG. 11 illustrates an operation of a UE according to another embodiment of the present disclosure.

In operation 1110, the UE may receive, from the BS, configuration information related to a DL control channel, i.e., PDCCH, (including configuration information for the CORESETs and the SSs) and DL SPS related configuration information. In this case, the PDCCH related configuration information and the DL SPS related configuration information may be received together as one piece of information or may be received separately. When the PDCCH related configuration information and the DL SPS related configuration information are received separately, one of the PDCCH related configuration information and the DL SPS related configuration may be received first while the other may be received later, or they may be received simultaneously.

In operation 1120, the UE may perform monitoring on the PDCCH in SSs according to the PDCCH configuration information.

In operation 1130, the UE may determine whether DL SPS activation indication information is received from the BS. In an embodiment, the UE may receive an indicator or DCI format indicating activation of DL SPS as the DL SPS activation indication information. The DCI format may include information corresponding to all or some of pieces of scheduling information (See Tables 8 and 9).

When the UE receives the DL SPS activation indication information in operation 1130, the UE may perform operation 1140 and stop monitoring on the DL control channel for receiving a DL data channel. In detail, the UE may stop PDCCH monitoring in all or some of the configured SSs. When the UE does not receive the DL SPS activation indication information in operation 1130, the UE may perform operation 1150 so as to continuously monitor the DL control channel for receiving the DL data channel. In detail, the UE may continuously perform PDCCH monitoring in a configured SS.

Embodiment 1-3

The embodiment 1-3 of the present disclosure proposes a method of releasing or deactivating DL SPS.

According to the embodiment 1-2 of the present disclosure, when the UE operates by activating DL SPS, the UE may skip PDCCH monitoring, thereby achieving a power saving effect. However, according to the method, it may be difficult to receive a DCI format for releasing the activated DL SPS. To solve this problem, various DL SPS release methods are presented below.

In some embodiments of the present disclosure, the UE may perform a release operation for the activated DL SPS by using at least one of the following methods or a combination of one or more thereof.

[DL SPS Release]
- Method #1: The UE may receive a command for releasing DL SPS from the BS via a MAC CE. The UE may receive the MAC CE including a command for releasing the DL SPS from the BS in slot n, and transmit a HARQ-ACK for the command to the BS in slot n+K. The UE may release the corresponding DL SPS after the slot n+K in which the HARQ-ACK is transmitted.
- Method #2: The BS may configure the UE with a time period corresponding to a timer for releasing the DL SPS via higher layer signaling. The UE may be configured by the BS with the time period corresponding to the timer for releasing the DL SPS via higher layer signaling. When the UE fails to receive a DL SPS-based PDSCH for the time period set for the timer, the UE may release the DL SPS. In a case that the UE receives a PDSCH via the DL SPS, the UE may initialize the configured timer.

In some embodiments of the present disclosure, when the DL SPS is released, the UE may additionally perform an operation corresponding to one of the following operations or a combination of one or more thereof.

[UE Operation after DL SPS Release]

Operation #1: If the UE has stopped PDCCH monitoring for all or some of the SSs after activation of the corresponding DL SPS, the UE may resume the suspended PDCCH monitoring after the DL SPS is released.

Operation #2: If the UE is monitoring a DIS after activation of the corresponding DL SPS, the UE may stop monitoring the DIS after the DL SPS is released.

Embodiment 2

In the embodiment 2 of the present disclosure, a method of performing grant-free (which may be alternatively referred to as configured scheduling or configured grant) transmission method for a PUSCH is described. As described above, for the grant-free transmission method for a PUSCH, the 5G wireless communication system may support two types: grant-free PUSCH transmission type 1 (or type-1 PUSCH transmission with a configured grant) and grant-free PUSCH transmission type 2 (or type-2 PUSCH transmission with a configured grant).

In the grant-free PUSCH transmission type 1, the BS may configure the UE with the specific time/frequency resources 600 that allow grant-free PUSCH transmission via higher layer signaling, e.g., RRC signaling. When receiving configuration information for the grant-free based PUSCH transmission type 1 from the BS, the UE may transmit a PUSCH using the periodically configured resources 600 without a grant from the BS. Various parameters required to transmit the PUSCH (e.g., frequency hopping, DMRS configuration, a MCS, a RBG size, the number of repetitions, a RV, precoding and the number of layers, antenna ports, a frequency hopping offset, etc.) may be set according to configuration values notified by the BS.

In the grant-free PUSCH transmission type 2, the BS may configure the UE with some (e.g., the periodicity information 603, etc.) of information about the specific time/frequency resources 600 that allow grant-free PUSCH transmission via higher layer signaling, e.g., RRC signaling. Furthermore, the BS may configure the UE with various parameters for PUSCH transmission (e.g., frequency hopping, DMRS configuration, a MCS table, a RBG size, the number of repetitions, a RV, etc.) via higher layer signaling. In addition to the above-described configuration information, scheduling information related to the PUSCH (e.g., information corresponding to all or some of the pieces of scheduling information in the DCI format that can be used for scheduling the PUSCH (see Tables 6 and 7)) may be transmitted to the UE via DCI (DCI transmitted for activating a UL grant Type 2).

The BS may transmit DCI including specific DCI field values to the UE for the purpose of scheduling activation or scheduling release for DL SPS and UL grant Type 2. The BS may receive and decode the PUSCH based on the configured grant-free PUSCH transmission scheduling information. The UE may obtain various pieces of scheduling information related to grant-free PUSCH transmission via DCI transmitted for activating the grant-free PUSCH transmission. Upon receiving the DCI indicating activation of the grant-free PUSCH transmission, the UE may transmit the PUSCH based on the configured grant-free PUSCH transmission scheduling information after a specific time point. The UE may or may not transmit the PUSCH in resources configured for the grant-free PUSCH transmission.

Depending on whether the BS successfully decodes the grant-free PUSCH transmission, the BS may feed back a HARQ-ACK to the UE. If the BS successfully decodes the PUSCH, the BS may feed back an ACK to the UE as HARQ-ACK information, and the if the BS fails to decode the PUSCH, the BS may feed back a NACK to the UE as HARQ-ACK information. A HARQ-ACK information bit value of '0' may represent a NACK, and a HARQ-ACK information bit value of '1' may represent an ACK.

The UE may determine whether to retransmit the PUSCH based on the HARQ-ACK information received from the BS. For any PUSCH transmitted by the UE to the BS, if the UE receives a NACK from the BS, the UE may perform retransmission of the corresponding PUSCH, and if the UE receives an ACK from the BS, the UE may not perform retransmission of the PUSCH.

As described above, the UE performing grant-free PUSCH transmission may or may not transmit the PUSCH in a resource region configured based on the grant-free PUSCH transmission scheduling information, and the BS may attempt to periodically monitor or decode the resource region where the PUSCH can be transmitted based on the grant-free PUSCH transmission scheduling information. Therefore, even when the UE does not transmit the PUSCH, the BS may unnecessarily perform a decoding operation on the PUSCH because the BS does not have prior information about it, and additionally transmit a NACK as HARQ-ACK as PUSCH detection fails. Accordingly, power consumption waste may occur due to the unnecessary decoding operation for the PUSCH and the operation of transmitting the HARQ-ACK and thus cause inefficient power usage.

Hereinafter, more efficient transmission and reception operations performed by the UE and the BS for grant-free PUSCH transmission are described in detail by describing various embodiments.

Embodiment 2-1

In embodiment 2-1 of the present disclosure, for minimizing a BS's unnecessary decoding operation on a grant-free based PUSCH, a DIS indicating whether the PUSCH is actually transmitted may be additionally considered. In detail, the UE may transmit, to the BS, a DIS indicating whether the PUSCH is actually transmitted in an activated grant-free PUSCH transmission resource region, and the BS may determine, based on the indication by the DIS received from the UE, whether to perform monitoring and/or decoding of the PUSCH in subsequent grant-free PUSCH transmission resources. If the DIS indicates that the BS shall perform monitoring and/or decoding of the PUSCH in grant-free PUSCH transmission resources (or it is notified that the PUSCH has been transmitted in the grant-free PUSCH transmission resources), the BS may perform monitoring and/or decoding of the PUSCH in the grant-free PUSCH transmission resources. In detail, if the BS performs monitoring on the PUSCH in grant-free PUSCH transmission resources and detect the PUSCH, the BS may perform decoding of the detected PUSCH. If the DIS indicates that the BS shall not perform monitoring and/or decoding of the PUSCH in the grant-free PUSCH transmission resources (or it is notified that the PUSCH will not be transmitted in the grant-free PUSCH transmission resources), monitoring and/or decoding of the PUSCH in the grant-free PUSCH transmission resources may be not performed.

The DIS may be referred to as a data indicator, a PUSCH monitoring indicator, a PUSCH monitoring activation indicator, a WUS-PUSCH, a WUS for Configured Grant PUSCH (WUS-CG PUSCH), a power saving signal for PUSCH, a power saving signal for CG PUSCH, etc. A power saving signal may be expressed by various names such as a power control signal and a power configuration signal.

Grant-free PUSCH transmission and reception operations will be described in more detail below with reference to the drawings.

Figure 12:
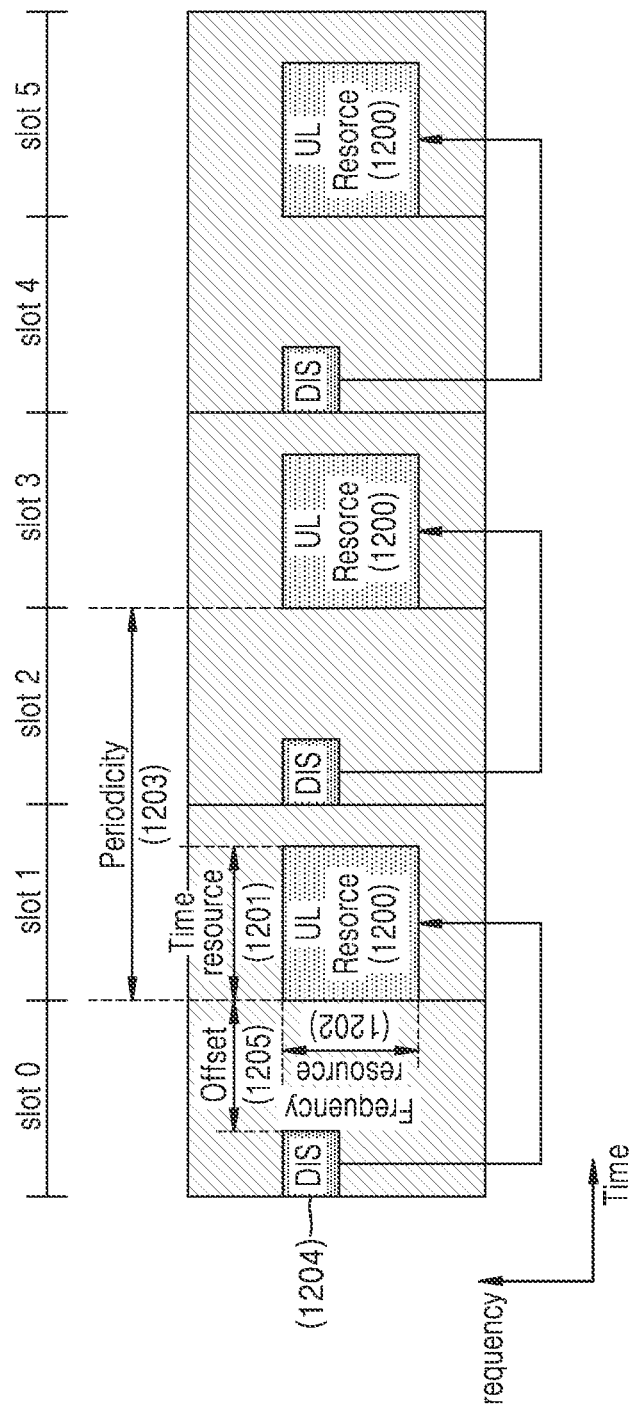
FIG. 12 illustrates an example of gran-free PUSCH transmission and reception operations according to an embodiment of the present disclosure.

FIG. 12 illustrates an example of gran-free PUSCH transmission and reception operations according to an embodiment of the present disclosure.

As described above, the BS may configure the UE with various pieces of scheduling information including a grant-free PUSCH transmission resource region (which may include a time resource region 1201, a frequency resource region 1202, and a periodicity 1203) via higher layer signaling and/or L1 signaling. The BS may additionally configure various parameters for the UE to transmit a DIS 1204 via higher layer signaling and/or L1 signaling. For example, the parameters may include the following pieces of information.

[DIS Related Configuration Information]
- A DIS transmission resource (time resource, frequency resource, transmission periodicity, monitoring occasion, etc.)
- An offset (e.g., an offset 1205) between a DIS transmission resource and a resource region configured for a grant-free based PUSCH
  - The BS may determine an offset value to be actually configured by taking into account a DL/UL switching delay.
- Association between a DIS and a grant-free PUSCH resource
  - For example, there may be mapping of one DIS to one grant-free PUSCH resource (one-to-one mapping), mapping of one DIS to a plurality of grant-free PUSCH resources (one-to-many mapping), or the like. Any DIS resource may be associated with any grant-free PUSCH resource, and the DIS may indicate whether to transmit a PUSCH in the associated grant-free PUSCH resource. The association between DIS and grant-free based PUSCH may be explicitly configured or implicitly determined.
- Information related to a method of transmitting a DIS (e.g., information related to transmission and a structure of a physical layer channel on which the DIS is transmitted)

In an embodiment of the present disclosure, the DIS may be transmitted in the form of a sequence. The parameters may include related parameter information for determining a DIS sequence (e.g., a sequence ID, an ID required to create a sequence, etc.).

In an embodiment of the present disclosure, the DIS may be transmitted in the form of a RS. A RS may include an SRS, etc.

In an embodiment of the present disclosure, the DIS may be transmitted via a PUCCH. A UCI format including the DIS may be defined, and the UCI format may be transmitted via the PUCCH.

The UE may receive configuration information related to the DIS 1204 from the BS and transmit the DIS based on the configuration information. The UE may receive an indicator or DCI format for activating specific grant-free PUSCH resources from the BS, and activate the corresponding grant-free PUSCH resources according to the content thereof. The BS may transmit the DIS from a time point after receiving the indicator for activating the grant-free PUSCH resources (e.g., after receiving the DCI format for activating the grant-free PUSCH resources or after X slots). Information about the time point when the UE transmits the DIS after receiving the DCI format for activating the grant-free PUSCH resources may be predefined, configured by the BS for the UE via higher layer signaling and/or L1 signaling, or determined by capability signaled by the UE to the BS. The BS may control a grant-free PUSCH reception operation based on control information transmitted in the DIS. For example, the DIS may include the following control information.

[Control Information Transmitted in DIS]
- Control information #1: a PUSCH monitoring indicator (or a PUSCH scheduling indicator)
  - An indicator indicating whether to perform a decoding operation on a PUSCH for a resource 1200 configured for a grant-free based PUSCH
- Control information #2: A length of a time period in which the content of control Information #1 is to be applied
  - An indicator indicating the length of the time period in which the BS will operate according to the content of the control information #1
- Control information #3: Information related to retransmission
  - NDI
  - HARQ process number In an embodiment of the present disclosure, the DIS may indicate whether to transmit a PUSCH in one or more grant-free PUSCH resources or a grant-free PUSCH resource group. The grant-free PUSCH resource group may consist of one or a plurality of grant-free PUSCH resources, and information about the grant-free PUSCH resource group may be configured by the BS for the UE via higher layer signaling.

In an embodiment of the present disclosure, all or some of the pieces of control information that can be transmitted in the DIS may be determined explicitly or implicitly. For example, a separate explicit field for the control information #1 may be present, or the control information may be implicitly determined based on whether the DIS is detected. As an example of an implicit determination method, if the DIS is detected, the BS may determine to perform monitoring on a grant-free based PUSCH, and if the DIS is not detected, the BS may not perform monitoring on the grant-free based PUSCH.

In an embodiment of the present disclosure, the UE may always transmit the DIS at a time point at which the configured DIS can be transmitted, or transmit it only when a specific condition is satisfied. For example, the DIS may always be transmitted and explicitly indicate whether the BS is to monitor the grant-free based PUSCH. As another example, the DIS may be transmitted when the PUSCH transmitted in grant-free PUSCH resources exists while the DIS may not be transmitted when the PUSCH transmitted in the grant-free PUSCH resources does not exist.

In an embodiment of the present disclosure, the BS may perform at least one of the following operations as a default operation or a fallback operation when the DIS is not detected.
- Operation #1: Monitoring of a PUSCH in grant-free PUSCH resources may be performed.
- Operation #2: Monitoring of the PUSCH in the grant-free PUSCH resources may not be performed.
- Operation #3: Whether to perform monitoring on the PUSCH in the grant-free PUSCH resources may be configured by the BS. If there is no configuration for the fallback operation, one of the operations #1 and #2 may be performed.

Figure 13:
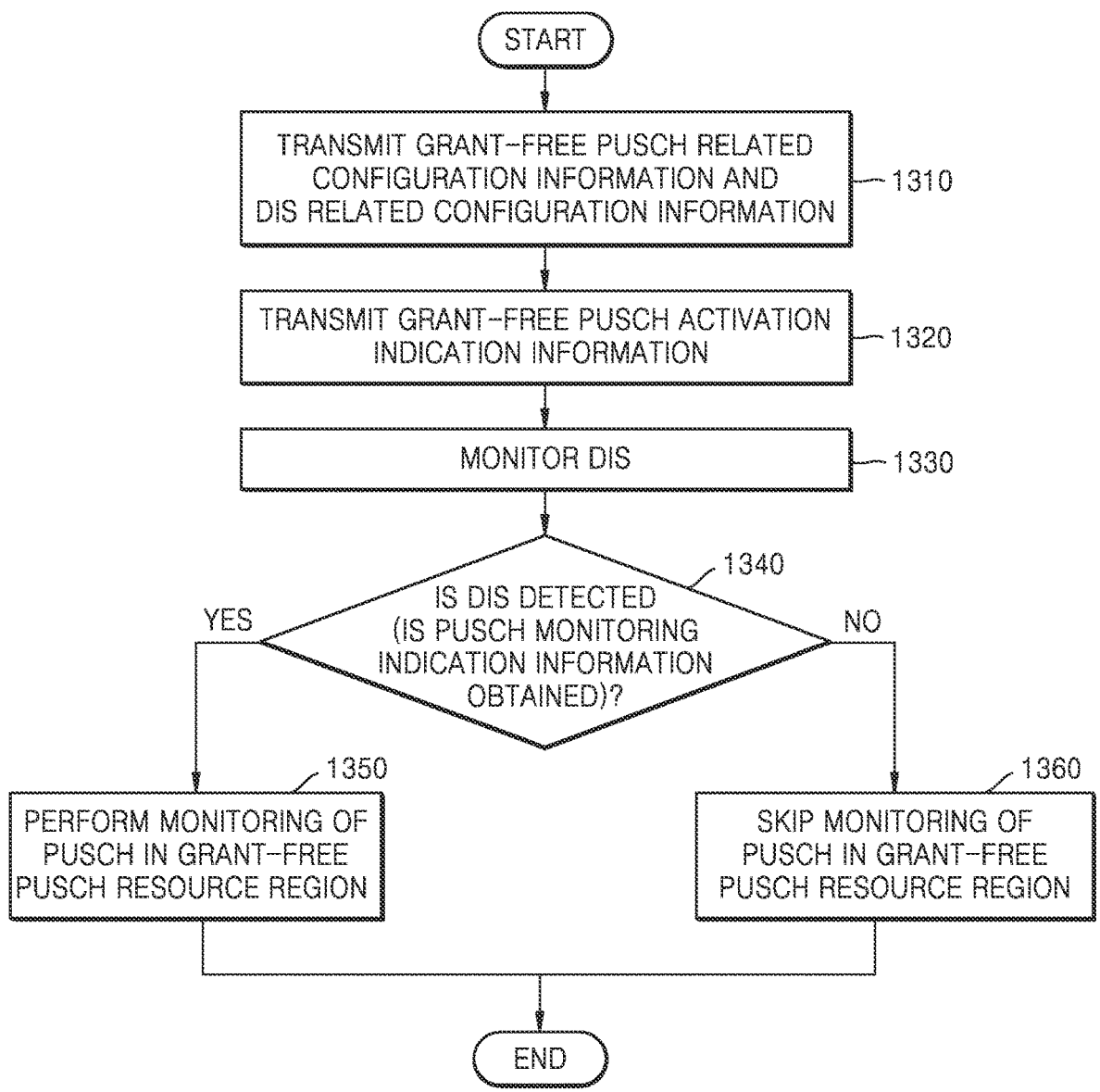
FIG. 13 illustrates an operation of a base station according to another embodiment of the present disclosure.

FIG. 13 illustrates an operation of a BS according to another embodiment of the present disclosure.

In operation 1310, a BS may transmit grant-free PUSCH related configuration information and DIS related configuration information to a UE via higher layer signaling and/or L1 signaling. In this case, the grant-free PUSCH related configuration information and the DIS related configuration information may be transmitted together as one piece of information or may be transmitted separately. When the grant-free PUSCH related configuration information and the DIS related configuration information are transmitted separately, one of the grant-free PUSCH related configuration information and the DIS related configuration information may be transmitted first while the other may be transmitted later, or they may be transmitted simultaneously. In an embodiment, the DIS related configuration information may include a transmission resource for a DIS, an offset between the DIS and a resource region configured by the grant-free PUSCH configuration information, association between the DIS and a transmission resource for a grant-free based PUSCH, information related to a method of transmitting the DIS, etc.

In operation 1320, the BS may transmit grant-free PUSCH activation indication information to the UE. In an embodiment, the BS may transmit an indicator or DCI format indicating activation of the configured grant-free based PUSCH as grant-free PUSCH activation indication information. The DCI format may include information corresponding to all or some of pieces of scheduling information (See Tables 6 and 7). In an embodiment, when the BS transmits the grant-free PUSCH activation indication information to the UE, the BS may stop transmission of a DL control channel for transmitting a UL data channel. Furthermore, when the BS transmits grant-free PUSCH release indication information, when decoding for a UL data channel fails, when the BS transmits a NACK feedback to the UE as HARQ-ACK information, when the BS transmits information indicating the start of monitoring of a DL control channel, or when a timer expires, the BS may transmit the DL control channel for receiving the UL data channel.

The BS may perform operation 1330 and monitor a DIS based on the DIS related configuration information. In an embodiment, the DIS may include monitoring indication information for a UL data channel, information about a time period during which monitoring of the UL data channel is to be performed, information related to retransmission, etc.

In operation 1340, the BS may determine whether the DIS is detected or whether monitoring indication information for a data channel, i.e., a grant-free based PUSCH, is obtained from the received DIS.

When the BS detects the DIS or obtains the monitoring indication information for the PUSCH in operation 1340, the BS may monitor the UL data channel based on at least one of the grant-free PUSCH related configuration information and the grant-free PUSCH activation indication information in operation 1350. In detail, the BS may perform monitoring of the PUSCH in a grant-free PUSCH resource region. When the BS fails to detect a DIS or obtain the monitoring indication information for the PUSCH in operation 1340, the BS may not perform monitoring on the PUSCH in the grant-free PUSCH resource region in operation 1360. In other words, the BS may skip the monitoring.

Figure 14:
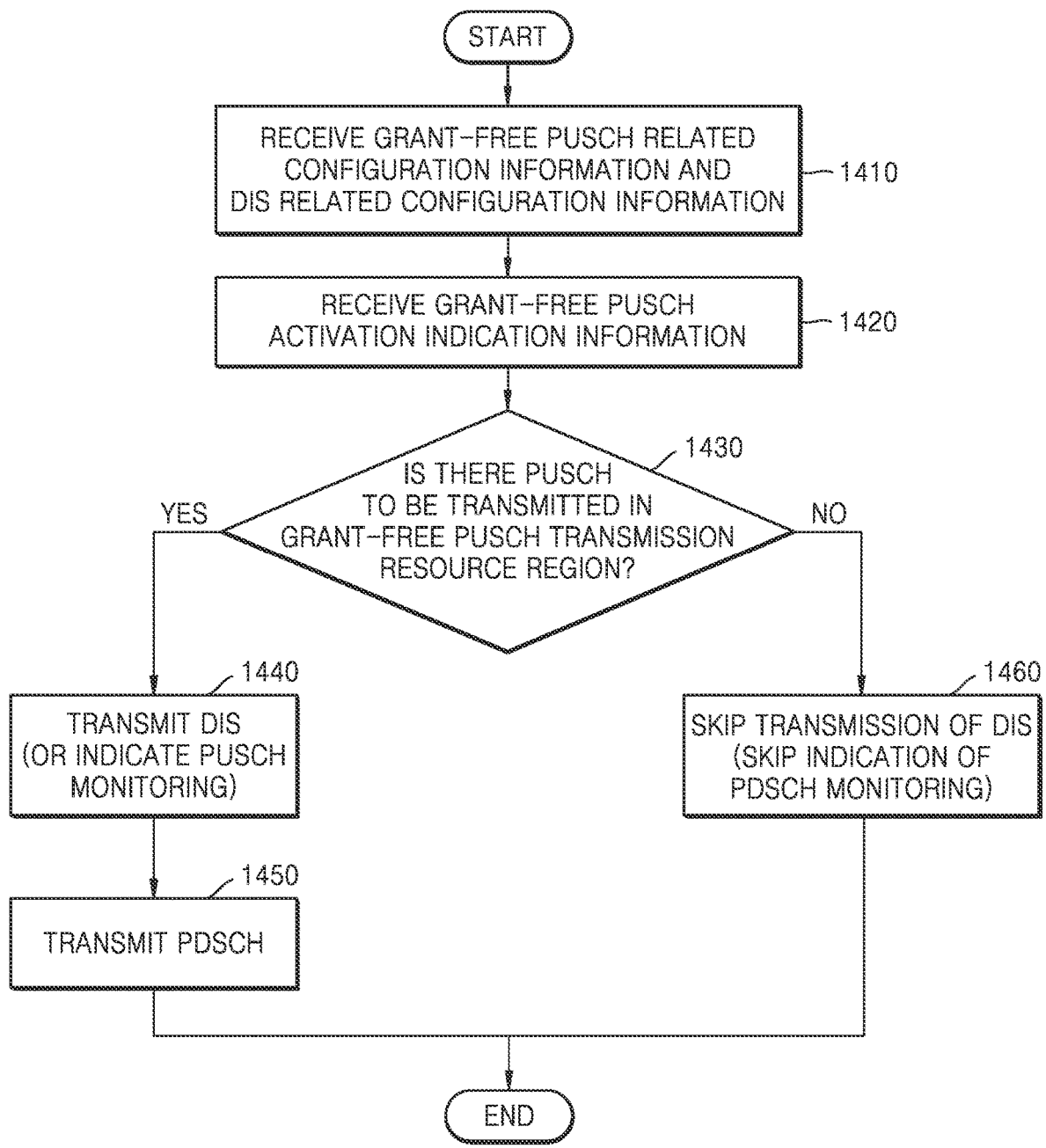
FIG. 14 illustrates an operation of a terminal according to another embodiment of the present disclosure.

FIG. 14 illustrates an operation of a UE according to some embodiments of the present disclosure.

In operation 1410, the UE may receive grant-free PUSCH related configuration information and DIS related configuration information from the BS via higher layer signaling and/or L1 signaling. In this case, the grant-free PUSCH related configuration information and the DIS related configuration information may be transmitted together as one piece of information or may be transmitted separately. When the grant-free PUSCH related configuration information and the DIS related configuration information are received separately, one of the grant-free PUSCH related configuration information and the DIS related configuration information may be received first while the other may be received later, or they may be received simultaneously. In an embodiment, the DIS related configuration information may include a transmission resource for a DIS, an offset between the DIS and a resource region configured by the grant-free PUSCH configuration information, association between the DIS and a transmission resource for a grant-free based PUSCH, information related to a method of transmitting the DIS, etc.

In operation 1420, the UE may receive grant-free PUSCH activation indication information from the BS. In an embodiment, the UE may receive an indicator or DCI format indicating activation of the configured grant-free based PUSCH as the grant-free PUSCH activation indication information. The DCI format may include information corresponding to all or some of pieces of scheduling information (See Tables 6 and 7).

In operation 1430, the UE may determine whether there is a UL data channel to be transmitted based on the grant-free PUSCH related configuration information. In an embodiment, the UE may determine whether a PUSCH to be transmitted in a resource configured for the grant-free based PUSCH exists at a specific time point. If the UE determines that there is a PUSCH to be transmitted in the grant-free PUSCH resource, the BS may perform operation 1440 so as to transmit a DIS to the BS based on the DIS related configuration information. In an embodiment, the UE may transmit a DIS based on the DIS related configuration information, or transmit an indicator indicating monitoring of the PUSCH as control information transmitted in the DIS. In an embodiment, the DIS may include monitoring indication information for a UL data channel, information about a time period during which monitoring of the UL data channel is to be performed, information related to retransmission, etc. Subsequently, in operation 1450, the UE may transmit the UL data channel to the BS. In other words, the PUSCH may be transmitted on the grant-free PUSCH resources. If the BS determines that there is no PUSCH to be transmitted using the grant-free PUSCH resources in operation 1430, the UE may perform operation 1460 so that it may not transmit the DIS or may transmit an indicator indicating that monitoring of the PUSCH is not to be performed as control information transmitted in the DIS.

Embodiment 2-2

The embodiment 2-2 of the present disclosure proposes a method of controlling monitoring of a PDCCH in order to prevent additional power consumption of a UE transmitting a grant-free based PUSCH. The UE operating by activating the grant-free based PUSCH may not perform PDCCH monitoring for the entire or a part of a search space set, or may selectively perform PDCCH monitoring when a specific condition is satisfied. The method according to the embodiment 2-2 is similar to the method of controlling monitoring of a PDCCH described above with respect to the embodiment 1-1. Thus, descriptions already provided are briefly provided.

The BS may configure the UE with a grant-free based PUSCH and transmit an indicator or DCI format that activates the grant-free based PUSCH. If the BS transmits the grant-free PUSCH activation indicator or DCI format, the BS may perform monitoring on a PUSCH in grant-free PUSCH resources. The BS may additionally control a UE's monitoring operation for the PDCCH for transmitting a PUSCH based on whether the grant-free PUSCH is activated. The UE that has been configured by the BS with a plurality of SSs SS #1, SS #2, and SS #3 may monitor a PDCCH on which a DCI format may be transmitted in the configured SSs. The UE that has received the DCI format for activating the grant-free based PUSCH at a specific time point may not perform PDCCH monitoring in the configured SSs from a time point after receiving the DCI format. In an embodiment, when the BS transmits grant-free PUSCH activation indication information to the UE, the BS may stop transmission of a DL control channel for transmitting a UL data channel, and the UE may stop monitoring the DL control channel for transmitting the UL data channel. In other words, the UE does not expect DCI-based PUSCH transmission and reception from a time point when the grant-free based PUSCH is activated, but may expect PUSCH transmission and reception based on the grant-free based PUSCH. By minimizing unnecessary PDCCH monitoring, power consumption of the UE may be significantly reduced.

In an embodiment of the present disclosure, after obtaining the indicator for activating the grant-free based PUSCH, the UE may stop PDCCH monitoring for all preconfigured SS sets. Alternatively, the UE may stop PDCCH monitoring for some SSs (hereinafter called a "first SS") among the preconfigured SS sets while continuously performing PDCCH monitoring for other SSs (hereinafter called a "second SS"). The first SS and the second SS may be explicitly configured by the BS for the UE via higher layer signaling or implicitly determined as SSs that satisfy a specific condition. For example, SSs having the following characteristics may correspond to the "first SS".

[First SS]
  A SS having a SS type configured as a UE-specific SS
  A SS receiving a DCI format for activating a grant-free based PUSCH
  A SS not configured for the purpose of a retransmission operation for a grant-free based PUSCH For example, SSs having the following characteristics may correspond to the "second SS".

[Second SS]
  A SS having a SS type configured as a common SS
  A SS configured to monitor a DCI format scrambled with SFI-RNTI (a DCI format corresponding to a SFI) among SSs having a SS type configured as a common SS
  A SS configured to monitor a DCI format scrambled with PI-RNTI (a DCI format corresponding to PI) among the SSs having a SS type configured as a common SS
  A SS configured for the purpose of a retransmission operation for a grant-free based PUSCH In an embodiment of the present disclosure, the UE may not perform PDCCH monitoring in all or some of the SSs from a specific time point after obtaining the indicator for activating the grant-free based PUSCH. Information about the time point when the UE stops PDCCH monitoring after obtaining the indicator for activating the grant-free based PUSCH may be predefined as a fixed value, configured via higher layer signaling from the BS, or determined by capability signaled by the UE to the BS.

In an embodiment of the present disclosure, the BS may not perform PDCCH monitoring in all or some of the SSs from a specific time point after obtaining the indicator for activating the grant-free based PUSCH, and may resume the PDCCH monitoring if a specific condition is satisfied. The specific condition may correspond to, for example, a condition corresponding to at least one of the following conditions or a combination of one or more thereof.

[Conditions for Resuming PDCCH Monitoring]
  Condition #1: When the UE receives an indicator or DCI format indicating release for a grant-free based PUSCH
  Condition #2: When the BS fails to decode a grant-free based PUSCH and transmits a NACK to the UE as HARQ-ACK information
  Condition #4: When the BS explicitly transmits an indicator or configuration information corresponding to resumption of PDCCH monitoring to the UE
  Condition #5: When a timer expires
    For example, the BS may configure the UE with a timer for resuming PDCCH monitoring and resume PDCCH monitoring when the timer expires.
    As another example, the BS may configure the UE with a timer for releasing a grant-free based PUSCH, and resume PDCCH monitoring when the timer expires because the grant-free based PUSCH is not detected for a specific time period.
  Various other types of timers may be used.

In other words, in an embodiment, when the BS transmits grant-free PUSCH release indication information to the UE, when the BS fails to decode a DL data channel, when the BS transmits a NACK feedback to the UE as HARQ-ACK information, when the BS transmits information indicating the start of monitoring of a DL control channel, or when a timer expires, the BS may transmit the DL control channel for receiving a UL data channel, and the UE may start monitoring the DL control channel for transmitting the UL data channel.

Embodiment 2-3

The embodiment 2-3 of the present disclosure proposes a method of releasing or deactivating grant-free PUSCH transmission.

According to the embodiment 2-3 of the present disclosure, when the UE operates by activating a grant-free based PUSCH, the UE may skip PDCCH monitoring, thereby achieving a power saving effect. However, according to the method, it may be difficult to receive a DCI format for releasing the activated grant-free based PUSCH. To solve this problem, various grant-free PUSCH release methods are presented below.

In some embodiments of the present disclosure, the UE may perform a release operation for the activated grant-free based PUSCH by using at least one of the following methods or a combination of one or more thereof.

[Grant-Free PUSCH Release]
  Method #1: The UE may receive a command for releasing a grant-free based PUSCH from the BS via a MAC CE. The UE may receive the MAC CE including a command for releasing the grant-free based PUSCH from the BS in slot n, and transmit a HARQ-ACK for the command to the BS in slot n+K. The UE may release the corresponding grant-free based PUSCH from a time point X (≥0) after the slot n+K in which the HARQ-ACK is transmitted.
  Method #2: The BS may configure the UE with a time period corresponding to a timer for releasing the grant-free based PUSCH via higher layer signaling. The UE may be configured by the BS with the time period corresponding to the timer for releasing the grant-free based PUSCH via higher layer signaling. When the UE does not transmit the grant-free based PUSCH for the time period set for the timer, the UE may release the grant-free based PUSCH. In a case that the UE transmits a PUSCH using grant-free PUSCH resources, the UE may initialize the configured timer.

In some embodiments of the present disclosure, when the grant-free based PUSCH is released, the UE may additionally perform an operation corresponding to one of the following operations or a combination of one or more thereof.

[UE Operation after Grant-Free PUSCH Release]
  Operation #1: If the UE has stopped PDCCH monitoring for all or some of the SSs after activation of the corresponding grant-free based PUSCH, the UE may resume the suspended PDCCH monitoring after the grant-free based PUSCH is released.

The above-described embodiments of the disclosure may be combined with each other for operation.

Figure 15:
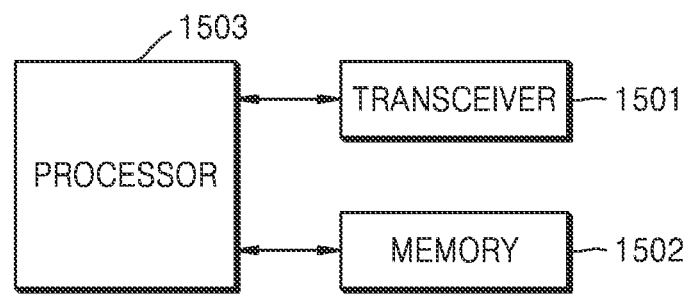
FIG. 15 illustrates a structure of a terminal according to an embodiment of the disclosure.
Figure 16:
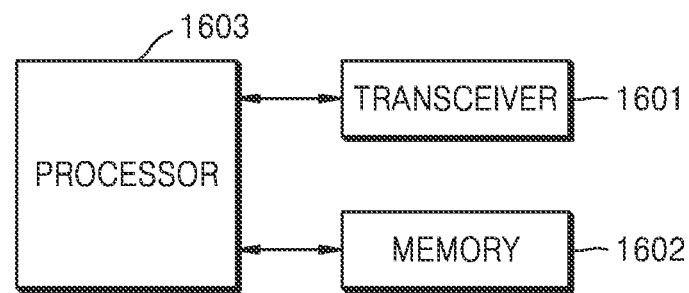
FIG. 16 illustrates a structure of a base station according to an embodiment of the present disclosure.

A transceiver, a memory, and a processor of each of a UE and a BS for implementing the above-described embodiments of the disclosure are illustrated in FIGS. 15 and 16.

In the embodiments, transmission and reception methods performed by the BS and the UE station for a grant-free based PDSCH and a grant-free based PUSCH are described. To perform the transmission and reception methods, a transceiver, a memory, and a processor of each of the BS and the UE need to operate according to the above-described embodiments.

FIG. 15 illustrates a structure of a UE according to an embodiment of the disclosure.

Referring to FIG. 15, the UE may include a transceiver 1501, a memory 1502, and a processor 1503. However, the components of the UE are not limited to the above-described example. For example, the UE may include more or fewer components than those described above. Furthermore, the transceiver 1501, the memory 1502, and the processor 1503 may be implemented as a single chip.

The transceiver 1501 may transmit or receive signals to or from a BS. Here, the signals may include control information and data. To do so, the transceiver 1501 may include a radio frequency (RF) transmitter for up-converting and amplifying a frequency of a signal to be transmitted and an RF receiver for low-noise amplifying a received signal and down-converting its frequency. Furthermore, the transceiver 1501 may receive a signal via a radio channel and output the signal to the processor 1503 and transmit a signal output from the processor 1503 via a radio channel.

According to an embodiment of the present disclosure, the memory 1502 may store data and programs necessary for operations of the UE. Furthermore, the memory 1502 may store control information or data included in a signal transmitted or received by the UE. The memory 1502 may be composed of storage media, such as read-only memory (ROM), random access memory (RAM), hard discs, compact disc (CD)-ROM, and digital versatile discs (DVDs), or a combination thereof. The memory 1502 may also be configured as a plurality of memories. According to an embodiment of the present disclosure, the memory 1502 may store programs for controlling PDCCH monitoring performed by the UE and receiving a PDSCH.

According to an embodiment of the present disclosure, the processor 1503 may control a series of processes such that the UE may operate according to the embodiments of the disclosure. For example, the processor 1503 may control monitoring of a DL control channel according to the embodiments of the present disclosure.

In detail, the processor 1503 may control the components of the UE that respectively perform operations of receiving configuration information for a PDCCH from the BS, monitoring the PDCCH from the BS based on the configuration information for the PDCCH received from the BS, and detecting the PDCCH based on the monitoring.

In addition, the processor 1503 may include a plurality of processors, and perform grant-free PDSCH and grant-free PUSCH transmission and reception methods according to the embodiments of the present disclosure by executing the programs stored in the memory 1502.

FIG. 16 illustrates a structure of a BS according to an embodiment of the present disclosure.

Referring to FIG. 16, the BS may include a transceiver 1601, a memory 1602, and a processor 1603. However, the components of the BS are not limited to the above-described example. For example, the BS may include more or fewer components than those described above. Furthermore, the transceiver 1601, the memory 1602, and the processor 1603 may be implemented as a single chip.

According to an embodiment of the present disclosure, the transceiver 1601 may transmit or receive signals to or from a UE. Here, the signals may include control information and data. To do so, the transceiver 1601 may include an RF transmitter for up-converting and amplifying a frequency of a signal to be transmitted and an RF receiver for low-noise amplifying a received signal and down-converting its frequency. Furthermore, the transceiver 1601 may receive a signal via a radio channel and output the signal to the processor 1603 and transmit a signal output from the processor 1603 via a radio channel.

According to an embodiment of the present disclosure, the memory 1602 may store data and programs necessary for operations of the BS. Furthermore, the memory 1602 may store control information or data included in a signal transmitted or received by the BS. The memory 1602 may be composed of storage media, such as ROM, RAM, hard discs, CD-ROM, and DVDs, or a combination thereof. The memory 1602 may also be configured as a plurality of memories. According to an embodiment of the present disclosure, the memory 1602 may store programs for performing a method used by the BS to control UE's monitoring of a DL control channel and generating and transmitting the DL control channel.

According to an embodiment of the present disclosure, the processor 1603 may control a series of processes such that the BS may operate according to the above embodiments of the disclosure. In detail, the processor 1603 may control the components of the UE for performing a method of controlling UE's monitoring of a DL control channel and generating and transmitting the DL control channel.

In addition, the processor 1603 may include a plurality of processors, and perform grant-free PDSCH and grant-free PUSCH transmission and reception methods according to the embodiments of the present disclosure by executing the programs stored in the memory 1602.

The methods according to the embodiments of the present disclosure described in the appended claims or specification thereof may be implemented in hardware, software, or a combination of hardware and software.

When the methods are implemented in software, a computer-readable storage medium or a computer program product having at least one program (software module) stored therein may be provided. The at least one program stored in the computer-readable storage medium or the computer program product is configured for execution by at least one processor within an electronic device. The at least one program includes instructions that cause the electronic device to execute the methods according to the embodiments of the present disclosure described in the claims or specification thereof.

The program (software module or software) may be stored in RAM, non-volatile memory including a flash memory, ROM, electrically erasable programmable ROM (EEPROM), magnetic disc storage devices, CD-ROM, DVDs or other types of optical storage devices, and magnetic cassettes. Alternatively, the program may be stored in a memory that is configured as a combination of some or all of the stated devices. A plurality of such devices may be included in the memory.

Furthermore, the program may be stored in an attachable storage device that may be accessed through communication networks, such as the Internet, Intranet, a local area network (LAN), a wide LAN (WLAN), and a storage area network (SAN), or a communication network configured in a combination thereof. The storage device may connect to a device for performing the methods according to the embodiments of the present disclosure via an external port. Furthermore, a separate storage device on a communication network may also connect to a device for performing the methods according to the embodiments of the present disclosure.

In the specific embodiments of the present disclosure, a component included in the present disclosure is expressed in a singular or plural form depending on the presented specific embodiments. However, singular or plural expressions are selected to be suitable for situations presented for convenience of description, and the present disclosure is not limited to elements in a singular or plural form, i.e., an element expressed in a plural form may be configured as a single element, or an element expressed in a singular form may be configured as a plurality of elements.

Moreover, the embodiments of the present disclosure disclosed in the present specification and the accompanying drawings are provided only as specific examples in order to easily describe the technical idea of the present disclosure and assist in understanding the present disclosure and are not intended to limit the scope of the present disclosure. In other words, it is obvious to those of ordinary skill in the art that other modifications may be made based on the technical spirit of the present disclosure. Furthermore, the embodiments may be combined with each other for operation when necessary. For example, an embodiment of the present disclosure may be combined with parts of other embodiments thereof to operate the BS and the UE. In addition, the embodiments of the present disclosure are applicable to other communication systems, and other modifications based on the technical idea of the embodiments may also be implementable therein. For example, the embodiments may be applied to LTE systems, 5G or NR systems, etc.

The invention claimed is:

1. A grant-free reception method performed by a terminal in a mobile communication system, the grant-free reception method comprising:
receiving, from a base station, configuration information related to downlink semi-persistent scheduling (SPS) and configuration information related to a data indication signal (DIS), wherein the DIS is a sequence and the configuration information related to the DIS includes an identity (ID) required to create the sequence;
receiving, from the base station, downlink SPS activation indication information;
in response to the downlink SPS activation indication information, monitoring the DIS based on the ID included in the configuration information related to the DIS; and
when the DIS is detected or monitoring indication information for a downlink data channel is obtained from the detected DIS, monitoring the downlink data channel based on the configuration information related to the downlink SPS.

2. The grant-free reception method of claim 1, further comprising, when the downlink SPS activation indication information is received from the base station, stopping monitoring a downlink control channel for receiving the downlink data channel.

3. The grant-free reception method of claim 2, further comprising starting monitoring the downlink control channel for receiving the downlink data channel when receiving downlink SPS release indication information from the base station, when failing to decode the downlink data channel, when transmitting a negative acknowledgement (NACK) feedback to the base station as hybrid automatic repeat request ACK (HARQ-ACK) information, when receiving information indicating a start of monitoring of the downlink control channel, or when a timer expires.

4. The grant-free reception method of claim 1, wherein the configuration information related to the DIS includes:
a transmission resource for the DIS,
an offset between the transmission resource for the DIS and a resource region configured for the downlink SPS, wherein the offset is determined based on a preferred offset indicated by capability signaling of the terminal, and
mapping information between the DIS and a plurality of transmission resources for the downlink data channel.

5. The grant-free reception method of claim 1, wherein the DIS includes at least one of the monitoring indication information for the downlink data channel, information about a time period during which monitoring of the downlink data channel is to be performed, and information related to retransmission.

6. A grant-free transmission method performed by a base station in a mobile communication system, the grant-free transmission method comprising:
transmitting, to a terminal, configuration information related to downlink semi-persistent scheduling (SPS) and configuration information related to a data indication signal (DIS), wherein the DIS is a sequence and the configuration information related to the DIS includes an identity (ID) required to create the sequence;
transmitting, to the terminal, downlink SPS activation indication information;
in response to the downlink SPS activation indication information, transmitting the DIS to the terminal based on the configuration information related to the DIS, when there is a downlink data channel to be transmitted based on the configuration information related to the downlink SPS; and
transmitting the downlink data channel,
wherein the DIS is monitored at the terminal based on the ID included in the configuration information related to the DIS.

7. The grant-free transmission method of claim 6, further comprising, when the downlink SPS activation indication information is transmitted to the terminal, monitoring of a downlink control channel for the downlink data channel is stopped.

8. The grant-free transmission method of claim 7, further comprising transmitting the downlink control channel for transmitting the downlink data channel when transmitting downlink SPS release indication information to the terminal, when receiving a negative acknowledgement (NACK) feedback from the terminal as hybrid automatic repeat request ACK (HARQ-ACK) information, or when transmitting information indicating a start of monitoring of the downlink control channel to the terminal.

9. The grant-free transmission method of claim 6, wherein the configuration information related to the DIS includes:
 a transmission resource for the DIS,
 an offset between the transmission resource for the DIS and a resource region configured for the downlink SPS, wherein the offset is determined based on a preferred offset indicated by capability signaling of the terminal, and
 mapping information between the DIS and a plurality of transmission resources for the downlink data channel.

10. The grant-free transmission method of claim 6, wherein the DIS includes at least one of monitoring indication information for the downlink data channel, information about a time period during which monitoring of the downlink data channel is to be performed, and information related to retransmission.

11. A terminal performing a grant-free reception method in a mobile communication system, the terminal comprising:
 a communicator;
 at least one memory storing a program for performing the grant-free reception method; and
 at least one processor configured to execute the program for performing the grant-free reception method to control:
  receiving, from a base station, configuration information related to downlink semi-persistent scheduling (SPS) and configuration information related to a data indication signal (DIS), wherein the DIS is a sequence and the configuration information related to the DIS includes an identity (ID) required to create the sequence;
  receiving, from the base station, downlink SPS activation indication information;
  in response to the downlink SPS activation indication information, monitoring the DIS based on the ID included in the configuration information related to the DIS; and
  when the DIS is detected or monitoring indication information for a downlink data channel is obtained from the detected DIS, monitoring the downlink data channel based on the configuration information related to the downlink SPS.

12. The terminal of claim 11, wherein the at least one processor is further configured to control, when the downlink SPS activation indication information is received from the base station, stopping monitoring a downlink control channel for receiving the downlink data channel.

13. The terminal of claim 12, wherein the at least one processor is further configured to control starting monitoring the downlink control channel for receiving the downlink data channel when receiving downlink SPS release indication information from the base station, when failing to decode the downlink data channel, when transmitting a negative acknowledgement (NACK) feedback to the base station as hybrid automatic repeat request ACK (HARQ-ACK) information, when receiving information indicating a start of monitoring of the downlink control channel, or when a timer expires.

14. The terminal of claim 11, wherein the configuration information related to the DIS includes:
 a transmission resource for the DIS,
 an offset between the transmission resource for the DIS and a resource region configured for the downlink SPS, wherein the offset is determined based on a preferred offset indicated by capability signaling of the terminal, and
 mapping information between the DIS and a plurality of transmission resources for the downlink data channel.

15. The terminal of claim 11, wherein the DIS includes at least one of the monitoring indication information for the downlink data channel, information about a time period during which monitoring of the downlink data channel is to be performed, and information related to retransmission.

\* \* \* \* \*